US009514737B2

(12) United States Patent
Takei et al.

(10) Patent No.: US 9,514,737 B2
(45) Date of Patent: Dec. 6, 2016

(54) NAVIGATION APPARATUS

(75) Inventors: Takumi Takei, Tokyo (JP); Yuki Furumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 215 days.

(21) Appl. No.: 14/118,196

(22) PCT Filed: Sep. 13, 2011

(86) PCT No.: PCT/JP2011/005141
§ 371 (c)(1),
(2), (4) Date: Nov. 15, 2013

(87) PCT Pub. No.: WO2013/038440
PCT Pub. Date: Mar. 21, 2013

(65) Prior Publication Data
US 2014/0074473 A1    Mar. 13, 2014

(51) Int. Cl.
*G10L 15/00* (2013.01)
*G10L 15/22* (2006.01)
*G01C 21/36* (2006.01)

(52) U.S. Cl.
CPC ......... *G10L 15/005* (2013.01); *G01C 21/3608* (2013.01); *G10L 15/22* (2013.01); *G10L 2015/227* (2013.01)

(58) Field of Classification Search
CPC . G10L 15/00; G10L 15/22; G10L 2015/223; G10L 17/00; G10L 17/04; G10L 17/06; G10L 17/22
USPC .................................. 704/231, 246, 251, 253
See application file for complete search history.

(56) References Cited

U.S. PATENT DOCUMENTS

| 6,249,720 B1 | 6/2001 | Kubota et al. | |
| 6,975,988 B1* | 12/2005 | Roth | G10L 15/26 345/184 |
| 2002/0032568 A1* | 3/2002 | Saito | G10L 15/18 704/246 |
| 2008/0162137 A1* | 7/2008 | Saitoh | G10L 15/22 704/251 |
| 2009/0005961 A1* | 1/2009 | Grabowski | G01C 21/365 701/532 |

(Continued)

FOREIGN PATENT DOCUMENTS

| JP | 4-344930 A | 12/1992 |
| JP | 11-250395 A | 9/1999 |
| JP | 2001-166794 A | 6/2001 |

(Continued)

*Primary Examiner* — Richemond Dorvil
*Assistant Examiner* — Rodrigo Chavez
(74) *Attorney, Agent, or Firm* — Birch, Stewart, Kolasch & Birch, LLP

(57) ABSTRACT

A navigation apparatus capable of providing a user not only with guidance, but also with all of the guidance, operational procedure, operation screen and recognition vocabulary, that is, with an operational transition that is defined by the guidance, operational procedure, operation screen and recognition vocabulary, while altering the operational transition in accordance with the recognition vocabulary comprehension level of the user. Thus, it can increase the possibility for a user with a low recognition vocabulary comprehension level to achieve a task, or for a user with a high recognition vocabulary comprehension level to improve the comfortableness of the operation, thereby being able to provide all the users with the optimum operational transition.

16 Claims, 26 Drawing Sheets

(56) References Cited

U.S. PATENT DOCUMENTS

| | | | |
|---|---|---|---|
| 2009/0055178 A1* | 2/2009 | Coon | B60R 16/0373 704/246 |
| 2010/0049515 A1* | 2/2010 | Sumiyoshi | G10L 15/26 704/246 |
| 2010/0191451 A1 | 7/2010 | Andoh | |
| 2012/0271636 A1* | 10/2012 | Fujisawa | G10L 15/22 704/270 |
| 2013/0054243 A1* | 2/2013 | Ichikawa | G06F 3/167 704/246 |

FOREIGN PATENT DOCUMENTS

| | | |
|---|---|---|
| JP | 2003-114794 A | 4/2003 |
| JP | 2005-84589 A | 3/2005 |
| JP | 2006-295552 A | 10/2006 |
| JP | 2007-163895 A | 6/2007 |
| JP | 2010-169642 A | 8/2010 |
| WO | WO 2008/084575 A1 | 7/2008 |

* cited by examiner

FIG.4

| Recognition Vocabulary Comprehension Level | Correction Operation Frequency |
|---|---|
| 3 | 0~3 |
| 2 | 4~7 |
| 1 | 8~10 |

FIG.6

| Functions | Input Contents |
|---|---|
| Address Search | Address |
|  | Zip Code |
| Telephone Directory Search | Phone Number |
|  | Name |
| Facility Search | Facility Name |
|  | Place and Genre |
| Music Search | Artist Name |
|  | Title |

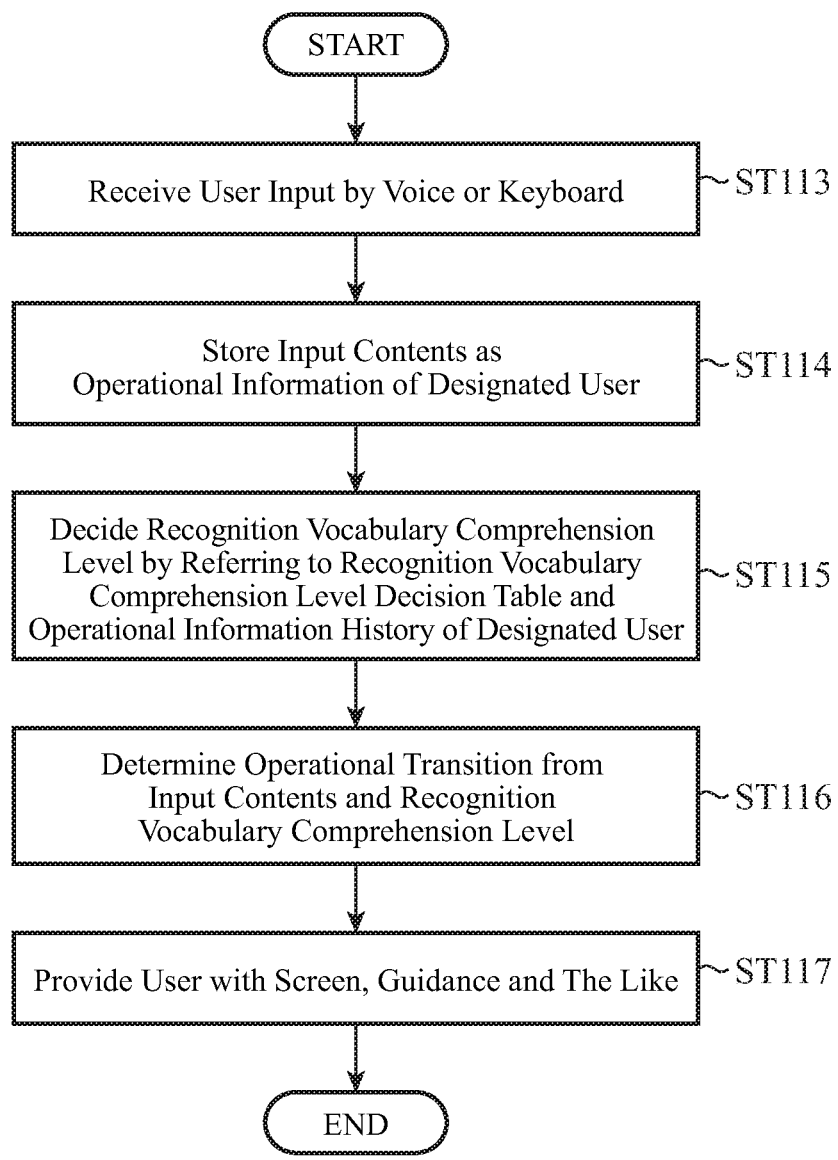

NAVIGATION APPARATUS

TECHNICAL FIELD

The present invention relates to a navigation apparatus capable of navigation through voice interaction between a user and an apparatus.

BACKGROUND ART

Generally, a navigation apparatus such as an onboard voice interactive apparatus has a prescribed operational transition for individual functions such as an address search, telephone directory search, facility search and music search, and the guide information through a voice output/screen output, which shows contents that can be input by voice and their operational procedure, does not vary for any user (for users with different recognition vocabulary comprehension levels, for example).

Accordingly, it has a problem of being unable to provide the optimum operational transition always for all the users in terms of comfortableness and ease of understanding.

Against such a problem, Patent Document 1, for example, describes an onboard voice recognition apparatus which alters the guide information through a voice output/screen output in accordance with the recognition vocabulary comprehension level of a user, and gives guidance the user can understand. The invention described in the Patent Document 1 decides the recognition vocabulary comprehension level from the correction frequency or the like of the user, and alters the guidance according to the recognition vocabulary comprehension level. Accordingly, it can make it easier for a user with a low recognition vocabulary comprehension level to understand by detailing the guidance. In addition, it can improve the comfortableness for a user with better recognition vocabulary comprehension level by simplifying the guidance.

PRIOR ART DOCUMENT

Patent Document

Patent Document 1: Japanese Patent Laid-Open No. 2008/084575.

DISCLOSURE OF THE INVENTION

Problems to be Solved by the Invention

Such a conventional apparatus as described above, however, alters only the guidance given to the user, and does not alter the prescribed operational procedure, operation screen and recognition vocabulary. Accordingly, it has the following problems. First, even if it gives detailed guidance, it is difficult for a user with a low recognition vocabulary comprehension level to understand the complicated recognition vocabulary including a compound word. In addition, as for a user with a better recognition vocabulary comprehension level, even if the guidance is simplified, it presents a troublesome problem of requiring a large number of input steps as before.

The present invention is implemented to solve the foregoing problems. Therefore it is an object of the present invention to provide a navigation apparatus capable of providing the guidance while altering the operational transition in such a manner as to give the optimum operational transition (including all of the guidance, operational procedure, operation screen and recognition vocabulary) for all the users in accordance with the recognition vocabulary comprehension level of the users.

Means for Solving the Problems

To accomplish the object, a navigation apparatus in accordance with the present invention comprises, in a navigation apparatus including a voice input unit that receives an instruction by voice input and a voice recognition unit that carries out voice recognition of the instruction received by the voice input unit, a recognition vocabulary comprehension level deciding unit that decides a user comprehension level of a recognition vocabulary, which is an instruction recognizable by the voice recognition unit, from at least one of correction operation frequency and time-out frequency in an operation which is carried out during the voice recognition by the voice recognition unit and corresponds to the instruction; an operational transition determining unit that determines an operational transition which is defined by guidance, an operational procedure, an operation screen and the recognition vocabulary in accordance with a decision result of the recognition vocabulary comprehension level deciding unit; and an operational transition providing unit for providing the operational transition determined by the operational transition determining unit.

Advantages of the Invention

According to the navigation apparatus in accordance with the present invention, it alters not only the guidance for a user, but also all of the guidance, operational procedure, operation screen and recognition vocabulary, that is, the operational transition defined by the guidance, operational procedure, operation screen and recognition vocabulary in accordance with the recognition vocabulary comprehension level of the user, thereby being able to increase the possibility of the user with a low recognition vocabulary comprehension level to achieve a task, or to improve the comfortableness of the operation of the user with a better recognition vocabulary comprehension level. As a result, it can provide the user with the optimum operational transition.

BRIEF DESCRIPTION OF THE DRAWINGS

FIG. 4 is a diagram showing an example of a recognition vocabulary comprehension level decision table;

FIG. 6 is a diagram showing an example of functions and input contents of the individual functions;

FIG. 28 is a flowchart showing the basic operation of the embodiment 11 after the user selection.

BEST MODE FOR CARRYING OUT THE INVENTION

The best mode for carrying out the invention will now be described with reference to the accompanying drawings.

Embodiment 1

Figure 1:
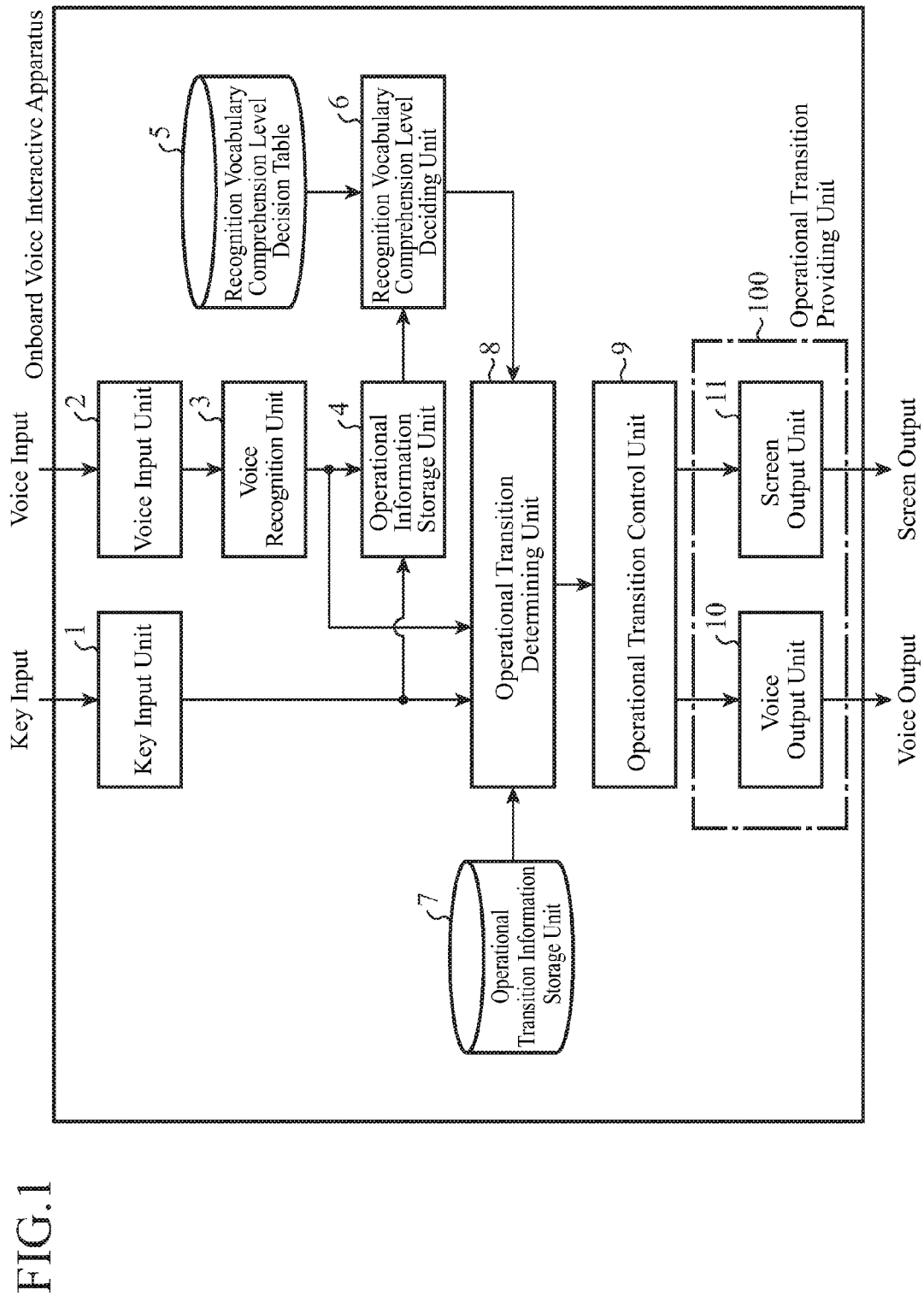
FIG. 1 is a block diagram showing an example of an onboard voice interactive apparatus of an embodiment 1.

FIG. 1 is a block diagram showing an example of an onboard voice interactive apparatus of an embodiment 1 in accordance with the present invention. The onboard voice interactive apparatus comprises a key input unit 1, a voice input unit 2, a voice recognition unit 3, an operational information storage unit 4, a recognition vocabulary comprehension level decision table 5, a recognition vocabulary comprehension level deciding unit 6, an operational transition information storage unit 7, an operational transition determining unit 8, an operational transition control unit 9, a voice output unit 10, and a screen output unit 11.

The key input unit 1 receives an instruction by a key operation (manual operation) from an input device such as a touch screen and a remote control, and supplies the instruction corresponding to the key input signal to the operational information storage unit 4 and operational transition determining unit 8.

The voice input unit 2 receives a user speech picked up with a microphone, that is, an instruction by voice input, and supplies the instruction corresponding to the voice input signal to the voice recognition unit 3.

The voice recognition unit 3 recognizes the instruction received by the voice input unit 2, and supplies the best-match command or string to the user speech content to the operational information storage unit 4 and operational transition determining unit 8 as a recognition result.

The operational information storage unit 4 stores various information items about operation contents and operations such as commands and strings corresponding to the instructions by the key input and voice input and time-out frequency and correction operation frequency as operational information (history).

The recognition vocabulary comprehension level decision table 5 defines relationships between the recognition vocabulary comprehension level indicating the degree of understanding of the recognition vocabulary by a user and the operational information about the user in each operation state (see FIG. 4).

The recognition vocabulary comprehension level deciding unit 6 decides the recognition vocabulary comprehension level in the present operation state by referring to the user operation history stored in the operational information storage unit 4 and the recognition vocabulary comprehension level decision table 5.

The operational transition information storage unit 7 is a database of an operational transition group that defines for each task at least one operational transition for each recognition vocabulary comprehension level.

The operational transition determining unit 8 determines the whole or partial operational transition from the operational transition group stored in the operational transition information storage unit 7 in accordance with the recognition vocabulary comprehension level, and supplies the operational transition control unit 9 with information (such as guidance) necessary for the operation screen and voice output of a transition destination corresponding to the user input.

The operational transition control unit 9 instructs to output the screen/voice at appropriate timing in response to the information acquired from the operational transition determining unit 8.

The voice output unit 10 makes a voice output of information voice such as guidance via a sound output medium like a speaker.

The screen output unit 11 makes a screen output of a screen consisting of an image and telop via a video output medium like a monitor.

Incidentally, the voice output unit 10 and the screen output unit 11 constitute an operational transition providing unit 100 that provides a user with the operational transition determined by the operational transition determining unit 8.

Here, definitions of the "recognition vocabulary" and "operational transition" will be described. The term "recognition vocabulary" in the present invention refers to a word or words of an instruction the voice recognition unit 3 can recognize in the operation. In addition, the term "operational transition" in the present invention refers to an entity defined by the guidance to a user on an operation, by the operation screen, by the operational procedure and by the recognition vocabulary.

Figure 2:
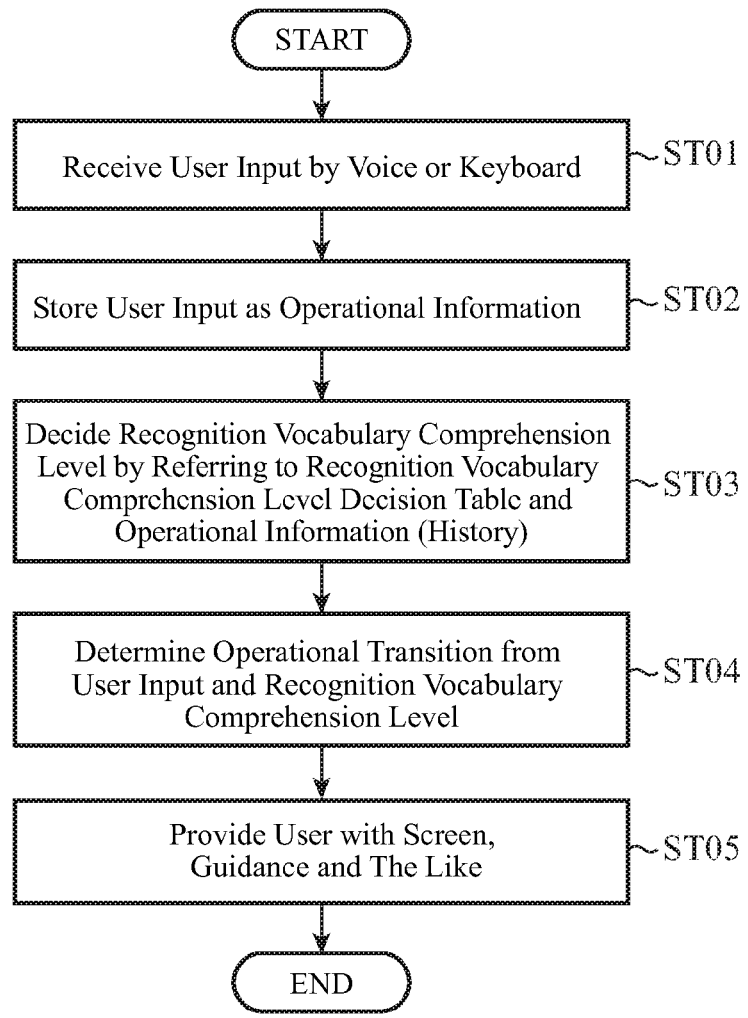
FIG. 2 is a flowchart showing the operation of the embodiment 1.

Next, the operation of the onboard voice interactive apparatus of the embodiment 1 with the foregoing configuration will be described by way of example applied to a system that searches for facilities. FIG. 2 is a flowchart showing the operation of the embodiment 1.

Figure 3:
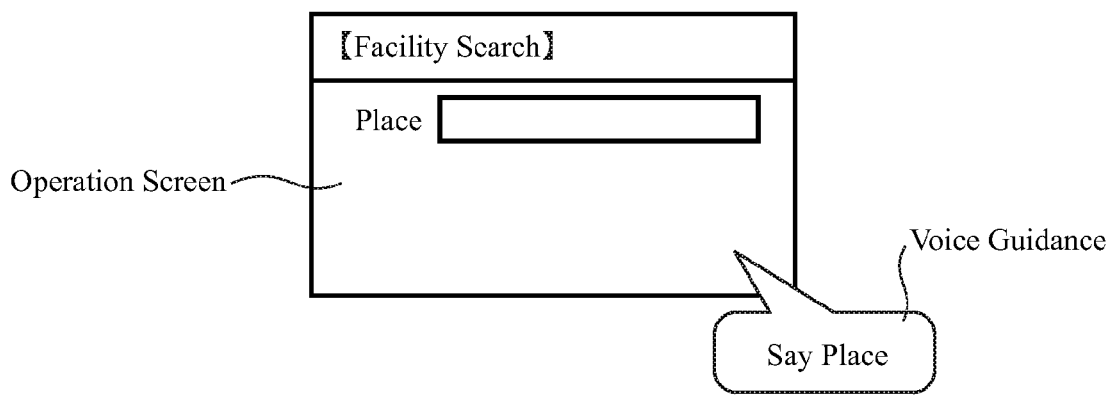
FIG. 3 is a diagram showing an example of an operation screen that accepts a user input by voice or a key operation (manual operation)

First, an operation screen and guidance as shown in FIG. 3 are provided to accept user input by voice or by key operation (manual operation) (step ST01). The information about the user input (various information items about the operation content and operation such as a command or string corresponding to an instruction by the key input or voice input, and the time-out frequency and the correction operation frequency in the operation corresponding to the instruction) is stored in the operational information storage unit 4 as the operational information in such a manner that the operational information can be obtained as a history in synchronization with the input steps (step ST02). In this case, the information about the voice input operation (the time-out frequency and the correction operation frequency in the operation corresponding to the instruction by the voice input) is monitored during the voice recognition by the voice recognition unit 3 and is stored as the operational information.

Next, using the recognition vocabulary comprehension level decision table 5 as shown in FIG. 4 and the operational information (history) about the correction operation frequency in the previous ten inputs of the user, the recognition vocabulary comprehension level is decided (step ST03). Here, the term "recognition vocabulary comprehension level" is an indicator showing the extent to which the user can understand the voice recognizable vocabulary, that is, an indicator showing whether the user can understand the "recognition vocabulary" which is a recognizable instruction the voice recognition unit 3 can understand, and can take an appropriate operation. In the present embodiment, the recognition vocabulary comprehension level is divided into three levels, and the level with a smaller value indicates poorer comprehension, and the level with a greater value indicates better comprehension. In addition, when the operational information for deciding the recognition vocabulary comprehension level is not enough such as at an initial use, a default of the recognition vocabulary comprehension level (2, for example) is used. Incidentally, as for the recognition vocabulary comprehension level, it is not limited to three levels, but can be divided into any levels. In addition, although the correction operation frequency is used as a condition for deciding the recognition vocabulary comprehension level here, the time-out frequency which indicates the number of times of being unable to complete the input within a prescribed time period can be used instead of the correction operation frequency. In addition, any conditions such as hesitation before saying and a heart rate can also be used for making the decision. Incidentally, it is assumed in the present invention that the decision is made using the correction operation frequency or the time-out frequency.

Next, the operational transition determining unit 8 determines the operational transition corresponding to the user input and recognition vocabulary comprehension level (step ST04). The operational transition information storage unit 7 stores "an operational transition made simpler by limiting the input contents per step and by increasing the number of steps" for a user with a low recognition vocabulary comprehension level and stores "an operational transition with its operation made comfortable by increasing the amount of information capable of being input per step and by reducing the number of input steps" for a user with a higher recognition vocabulary comprehension level.

By thus limiting the input contents for the user with a low recognition vocabulary comprehension level, it can provide more concrete guidance and operation screen, and can reduce the occurrence of "erroneous recognition" or "unexpected operation due to erroneous recognition", thereby being able to prevent a user from being confused during the voice operation and to increase the possibility of achieving the task of the user. In addition, as for a user with a higher recognition vocabulary comprehension level, since the simpler operational transition will give limited input contents and detailed description about the input contents, it will increase the time taken to achieve the task and make the user feel troublesome. Accordingly, for the user with a higher recognition vocabulary comprehension level, the operational transition determining unit 8 alters to the operational transition enabling inputting a plurality of information items collectively to enable the user to reduce the number of interactive steps and the time taken to achieve the task, thereby being able to improve the comfortableness of the user operation.

Figure 5:
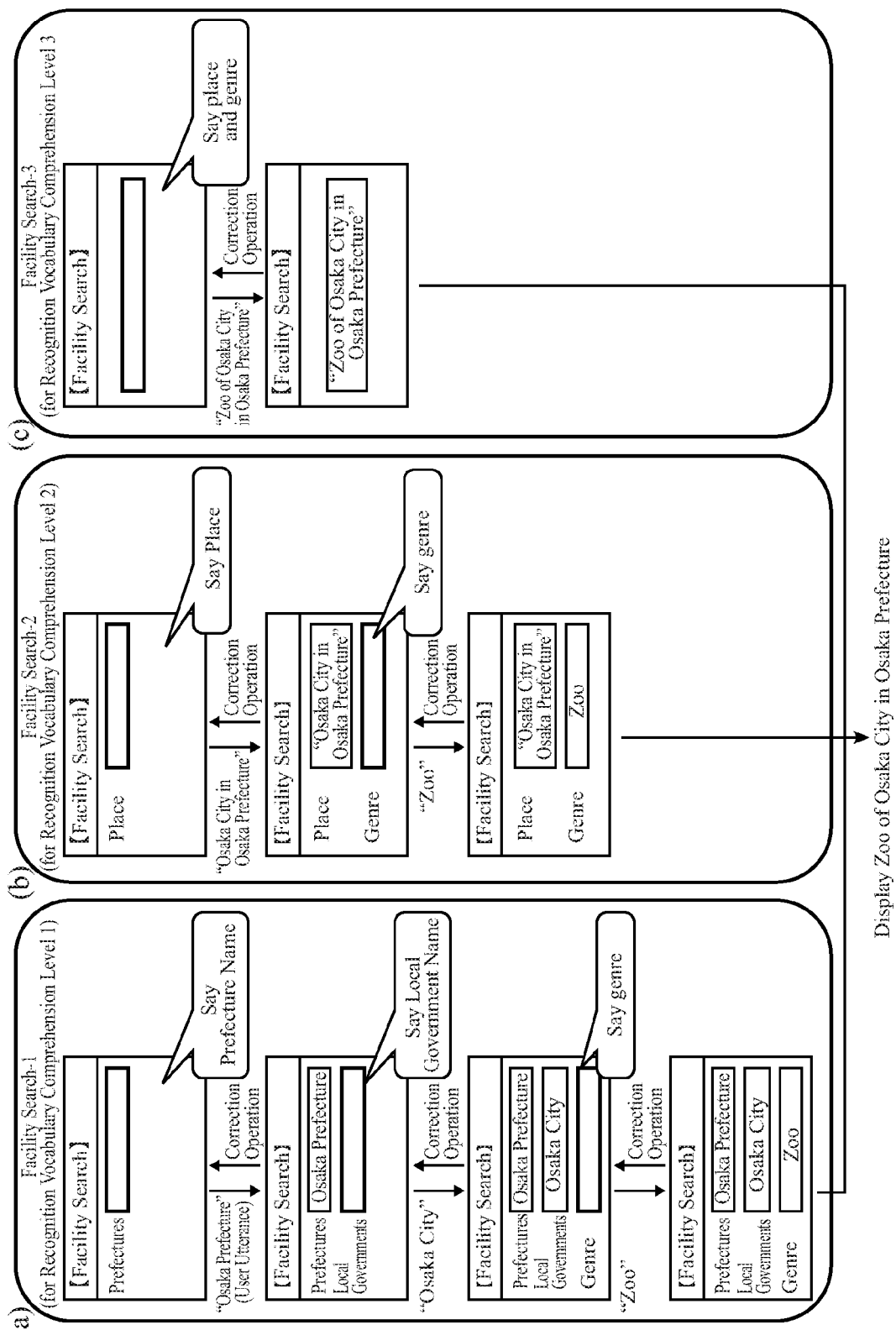
FIG. 5 is a diagram showing an example of an operational transition in a facility search, which corresponds to the individual recognition vocabulary comprehension levels.

FIG. 5 shows a concrete example of the operational transition given to the user. In FIG. 5, which shows operational transitions in a facility search, FIG. 5(*a*) shows an operational transition for the recognition vocabulary comprehension level 1, FIG. 5(*b*) shows an operational transition for the recognition vocabulary comprehension level 2, and FIG. 5(*c*) shows an operational transition for the recognition vocabulary comprehension level 3. FIG. 5(*a*) shows the operational transition for the recognition vocabulary comprehension level 1, which is made simpler by reducing the amount of information per input and by reducing the vocabulary to be used, although it requires three input steps for displaying a search result list. Incidentally, words in a balloon at the lower right of each operation screen is a guidance by voice or screen display. In addition, words in double quotes at the lower left of each operation screen is the words the user utters for the operation screen and guidance. In contrast with the operational transition shown in FIG. 5(*a*), the operational transition for the recognition vocabulary comprehension level 3 shown in FIG. 5(*c*) is prepared which can input the three steps of the operational transition for the recognition vocabulary comprehension level 1 at a single step.

In this way, as the recognition vocabulary comprehension level increases such as 1 to 2 to 3, the operational transition is altered stepwise in accordance with the ease of understanding and the number of steps. It is set in a manner that only a step-by-step alteration is carried out without making an abrupt alteration from the recognition vocabulary comprehension level 1 to 3 or 3 to 1. As a result, it can prevent the operational transition from changing extremely or excessively, thereby being able to prevent the user from an increase of troublesomeness or confusion.

In addition, the recognition vocabulary on the first operation screen in FIG. 5(*a*) is the names of the 47 prefectures of Japan such as "Osaka Prefecture". When a user utters a word in the vocabulary other than the 47 prefectures of Japan such as a "zoo" or "zoo of Osaka City in Osaka Prefecture" while the operation screen of the operational transition is being displayed, it is not recognized. This is for a user who is unfamiliar with the voice recognition to avoid an unexpected fault. More specifically, enabling recognition of all the vocabulary on any given operation screens of the operational transition is likely to bring about an unexpected event such as a radio starts sounding during the facility search, so that the unfamiliar user will lose his or her way how to deal with it.

In this way, the recognition vocabulary, which is instructions that can be recognized by the voice recognition unit, varies on the operation screen of the individual operational transitions, and if the recognition vocabulary comprehension level varies, all of the guidance to a user, operational procedure, operation screen and recognition vocabulary are changed, that is, the operational transition defined by the guidance, operational procedure, operation screen and recognition vocabulary is altered.

Incidentally, considering a case where a correction operation unrelated to the recognition vocabulary comprehension level can take place such as a correction operation of erroneous recognition due to leakage of speech of a fellow passenger, the recognition vocabulary comprehension level can be decided by assigning weights to correction operation frequencies using past task achievement experiences or the like. This will be described in more detail. For example, when the recognition vocabulary comprehension level is 2 and if the correction operation is carried out as to the vocabulary that can be recognized normally at the comprehension level, that is, as to the word which was recognizable without correction before, it is conceivable that the correction operation frequency is counted as one and thus the recognition vocabulary comprehension level falls to 1. However, this is not due to the low recognition vocabulary comprehension level, but due to the correction operation owing to another factor unrelated to the recognition vocabulary comprehension level. In view of such a case, when deciding the recognition vocabulary comprehension level, inappropriate alteration of the recognition vocabulary comprehension level can be prevented by adjusting in accordance with the past operation content history, that is, by assigning weights in such a manner as to stop counting the correction operation for the recognition vocabulary which has not undergone the correction operation in the past, or as to count 0.2 time instead of the usual counting of one. As a result, even if a user operation is detected which is considered to be due to a low recognition vocabulary comprehension level, if the factor of the detection is very likely to be different from the recognition vocabulary comprehension level, it can prevent the operational transition from being altered inappropriately.

In addition, although the facility search shown in FIG. 5 is executed by inputting a place and genre to search for the destination, a function that achieves the same task by inputting a phone number is common. Thus, it is also possible to provide an alternative transition capable of achieving the same object with different functions in accordance with the recognition vocabulary comprehension level such as by assigning, when the recognition vocabulary comprehension level is low, an operational transition (not shown) of a telephone directory search by a phone number so as to achieve the task by inputting only digits, or by assigning, when the recognition vocabulary comprehension level is high, the operational transition of the facility search using a place and genre (see FIG. 5(c)). In addition, an alternative transition can also be provided which is different in the input method although the functions are the same.

Here, the term "function" is divided into those such as an address search function, telephone directory search function, facility search function, and music search function, for which a search is made.

More specifically, the phrase "providing an alternative transition capable of achieving the same object with a different function" means the following case, for example. To search for a destination, for example, a case can occur where even though the operational transition of the address search function is provided for carrying out the search by inputting the destination address, the task cannot be achieved. In such a case, instead of providing the operational transition of the address search function, the operational transition of the telephone directory search function that executes the search by inputting the phone number is provided to prompt the user operation again. Thus, if the function provided to the user (or the function the user selects) differs in the contents from the user utterance, providing the alternative transition as mentioned above can increase the possibility for the user to achieve the task.

FIG. 6 is a diagram showing an example of the functions and input contents of the individual functions. As shown in FIG. 6, as for the operational transition of the same "facility search" function, for example, depending on whether the input content is a facility name such as "XX zoo" or a place and a genre as shown in FIG. 5, the operational transition varies. More specifically, even if the operational transitions have the same function, it is possible to provide an alternative transition with different input contents in accordance with the recognition vocabulary comprehension level or familiar recognition vocabulary of a user, or to provide an alternative transition which alters to a different function as described before.

According to the operational transition and input content thus determined, the operational transition providing unit 100 gives the user the screen output or voice output such as guidance (step ST05). After that, every time the user inputs, the same operation as described above is repeated.

In this case, as for the system with a plurality of functions such as a car navigation system as described above, the recognition vocabulary comprehension level of the user can change depending on the individual functions. More specifically, the same user can have a higher recognition vocabulary comprehension level for the address search function, but have a lower recognition vocabulary comprehension level for the facility search function. Accordingly, the decision of the recognition vocabulary comprehension level and the alteration of the operational transition based on the decision can be carried out for each function independently. This enables more detailed adjustment of the whole system, thereby being able to provide a user with a more user-friendly operational transition corresponding to each recognition vocabulary comprehension level of the individual functions.

As described above, according to the present embodiment 1, in accordance with the recognition vocabulary comprehension level of a user, it alters not only the guidance to the user, but also all of the guidance, operational procedure, operation screen and recognition vocabulary, that is, the operational transition specified by the guidance, operational procedure, operation screen and recognition vocabulary. Accordingly, it can increase the possibility for the user with a lower recognition vocabulary comprehension level to achieve a task, and for the user with a higher recognition vocabulary comprehension level to improve the comfortableness of the operation, thereby being able to provide the optimum operational transition to all the users.

Embodiment 2

Figure 7:
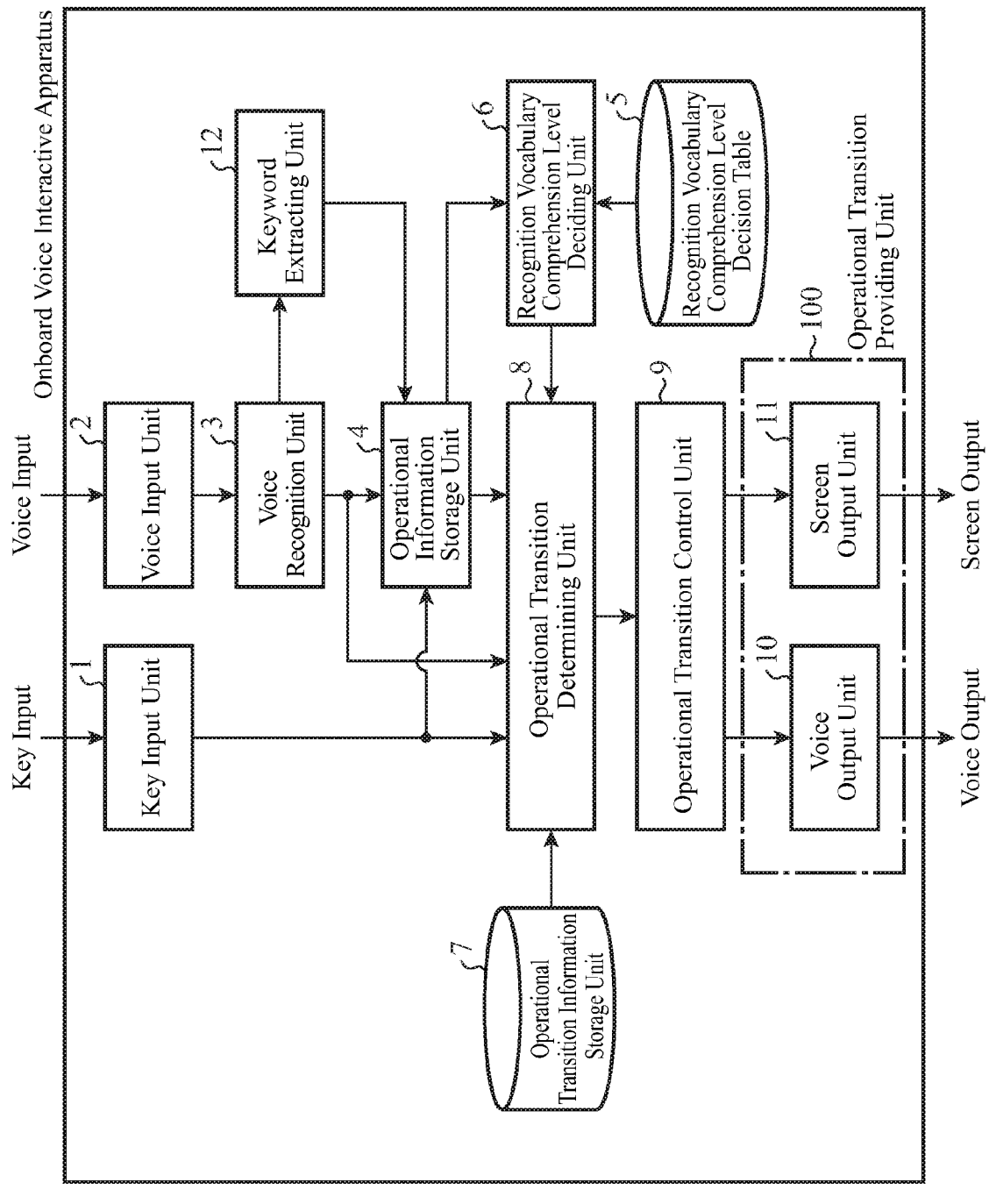
FIG. 7 is a block diagram showing an example of an onboard voice interactive apparatus of an embodiment 2.

FIG. 7 is a block diagram showing an example of an onboard voice interactive apparatus of an embodiment 2 in accordance with the present invention. Incidentally, the same components as those described in the embodiment 1 are designated by the same reference numerals and their duplicate description will be omitted. The following embodiment 2 further comprises a keyword extracting unit 12 that extracts a specific keyword from the voice recognition result. In the embodiment 2, the keyword is stored in the operational information storage unit 4 together with the operational information, and the operational transition determining unit 8 determines the operational transition, taking account of the keyword in addition to the user input and the decision result of the recognition vocabulary comprehension level.

For example, "an operational transition for searching for a destination by inputting a facility name" is assigned to a user with a high recognition vocabulary comprehension level, and both "an operational transition for searching for a destination by inputting an address" and "an operational transition for searching for a destination by inputting a phone number" are assigned to a user with a low recognition vocabulary comprehension level. When the recognition vocabulary comprehension level changes from "high" to "low" and if the voice recognition result of the user before the alteration of the operational transition includes a lot of keywords containing digits such as "zero" and "one", the "operational transition for searching for a destination by inputting a phone number" is provided.

Figure 8:
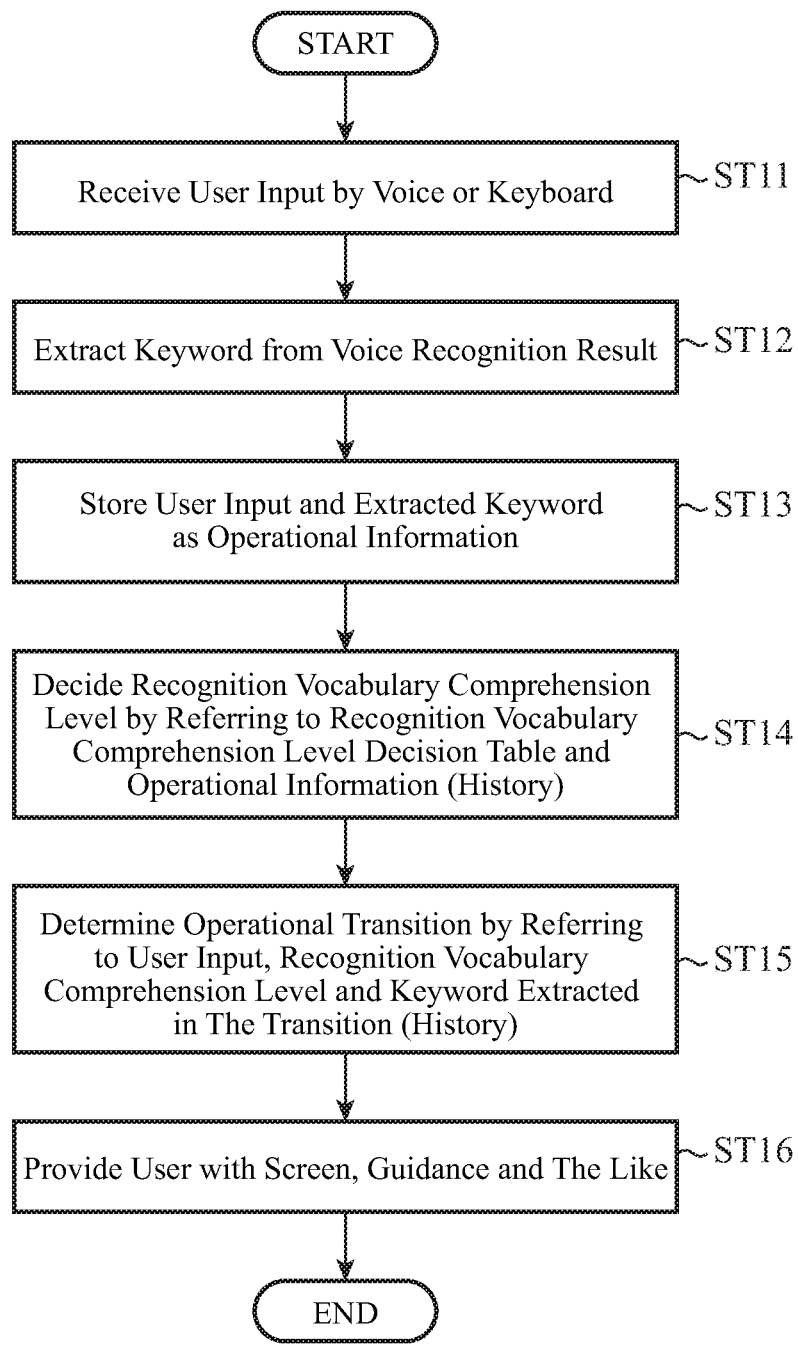
FIG. 8 is a flowchart showing the operation of the embodiment 2.

Next, the operation will be described. FIG. 8 is a flowchart showing the operation of the embodiment 2. As for the user input reception (step ST11) by voice or key operation and the processing (step ST16) after the determination of the operational transition, since they are the same as those of the embodiment 1 described in the flowchart of FIG. 2, their description will be omitted. After receiving the user input by voice, the voice recognition unit 3 extracts a keyword from the voice recognition result (step ST12). The keyword extracted is stored in the operational information storage unit 4 as the operational information in synchronism with the user input (step ST13).

After that, as in the embodiment 1, the recognition vocabulary comprehension level deciding unit 6 decides the recognition vocabulary comprehension level using the recognition vocabulary comprehension level decision table 5 as shown in FIG. 4 and the operational information (history) such as the correction operation frequency in the past 10 user inputs (step ST14). Then the operational transition determining unit 8 determines the operational transition by referring to the keyword extracted in the transition and stored as the operational information at step ST13 in addition to the present user input and the present recognition vocabulary comprehension level (step ST15).

As described above, according to the present embodiment 2, it is configured in such a manner as to comprise the keyword extracting unit that extracts a specific keyword from the user speech content, and to alter the operational transition in accordance with the keyword in the past speech and the recognition vocabulary comprehension level. For example, if a keyword indicating digits such as "zero" and "one" is extracted, and when the recognition vocabulary comprehension level in the address search function that searches for a destination by inputting an address is low, the present embodiment 2 can alter the operational transition of the address search function to the operational transition of the telephone directory search function that searches for the destination by inputting the phone number which is considered to be recognizable by the user. Thus, it can increase the possibility of enabling the user to achieve the task by providing an operational transition, which enables input of the content the user actually utters or the input of the information nearly equal to the content, to the user as an alternative transition.

Embodiment 3

Figure 9:
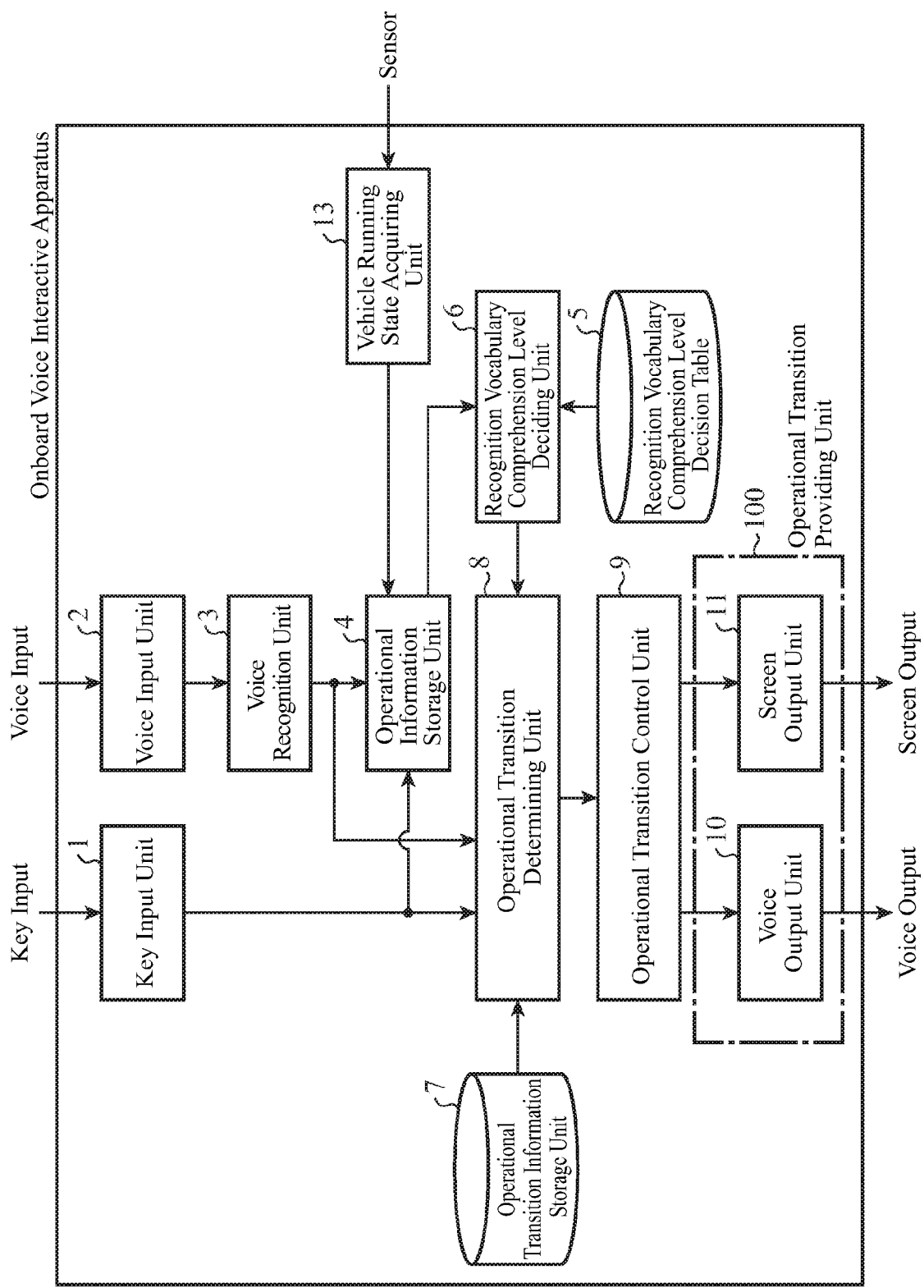
FIG. 9 is a block diagram showing an example of an onboard voice interactive apparatus of an embodiment 3.

FIG. 9 is a block diagram showing an example of the onboard voice interactive apparatus of an embodiment 3 in accordance with the present invention. Incidentally, the same components as those described in the embodiments 1 and 2 are designated by the same reference numerals and their duplicate description will be omitted. The following embodiment 3 comprises in addition to the embodiment 1 a vehicle running state acquiring unit 13 that acquires information about a vehicle running state such as the wheel steering angle of the vehicle, its speed, brake state and direction indicator state from sensors, decides the recognition vocabulary comprehension level taking account of the vehicle running state, and prevents inappropriate alteration of the operational transition.

For example, when the voice input timed out during the sharp turn (while the user cannot utter), the present embodiment makes a decision that the user puts off the utterance intentionally because the user concentrates on driving during the voice input reception of the system. In other words, it does not decide during the sharp turn that the input time-out occurs because the recognition vocabulary comprehension level is low. For example, it decides the recognition vocabulary comprehension level after excluding the operational information about the wheel steering angle of 90 degrees or more.

Figure 10:
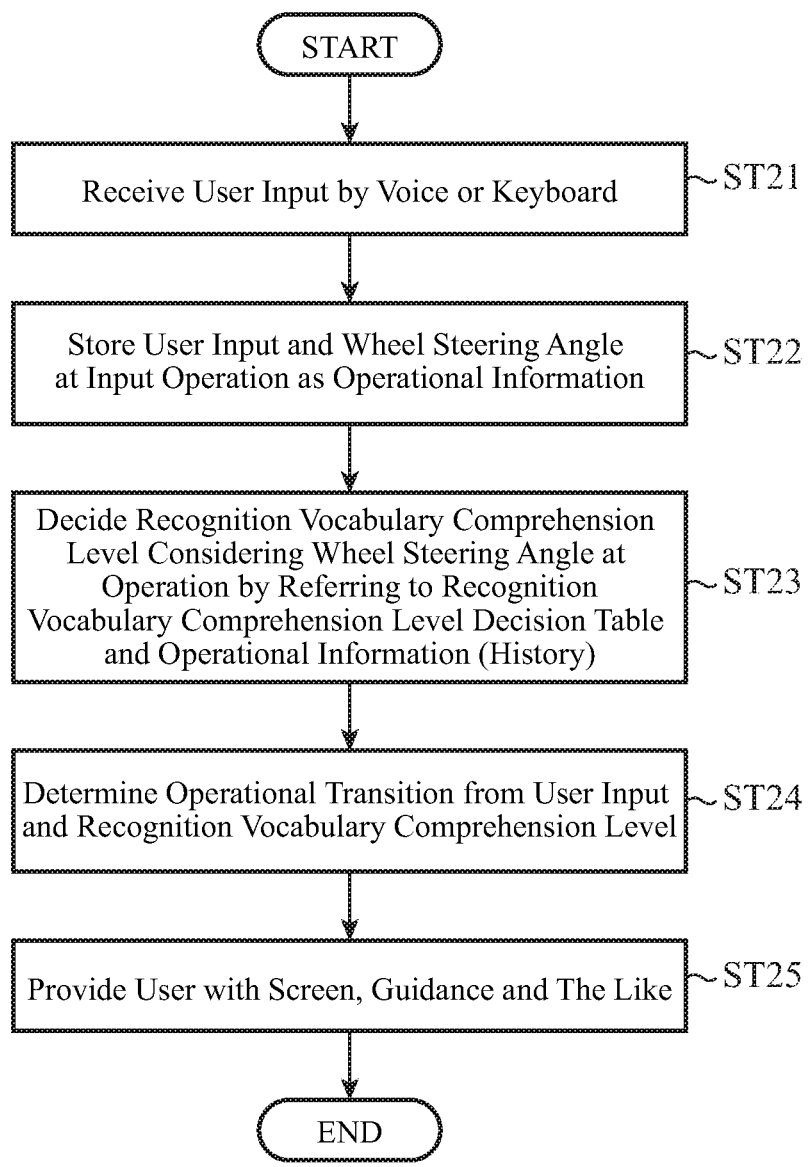
FIG. 10 is a flowchart showing the operation of the embodiment 3.

Next, the operation will be described. FIG. 10 is a flowchart showing the operation of the embodiment 3. As for the reception of the user input by voice or key operation (step ST21) and the processing after the decision of the recognition vocabulary comprehension level (step ST24 and step ST25), since they are the same as those of the embodiment 1, their description will be omitted. After the reception of the user input by voice or key operation, the operational information storage unit 4 stores in addition to the input information from the user the information acquired by the vehicle running state acquiring unit 13 (information from the sensor that detects the wheel steering angle in the present embodiment) as the operational information in such a manner that it is connected with the input information (step ST22). After that, the recognition vocabulary comprehension level is decided as in the embodiment 1 using the recognition vocabulary comprehension level decision table 5 as shown in FIG. 4 and the operational information (history) such as correction operation frequency in the past 10 user inputs. On this occasion, the decision of the recognition vocabulary comprehension level is made, taking account of the vehicle running state (wheel steering angle in the present embodiment) connected to each input (step ST23).

As described above, according to the present embodiment 3, even if it detects the operation of a user as to whom a decision is made to have a low recognition vocabulary comprehension level, it adjusts the standards for deciding the recognition vocabulary comprehension level by the vehicle running state. Accordingly, when the factor of the decision is likely to be unrelated to the recognition vocabulary comprehension level such as when a decision is made that the time-out of the voice recognition is likely to occur because the user concentrates on the driving such as a right or left turn of the vehicle, it does not decide that the recognition vocabulary comprehension level is low, or limits the amount of reduction of the recognition vocabulary comprehension level, thereby being able to prevent the operational transition from inappropriate alteration.

Embodiment 4

Figure 11:
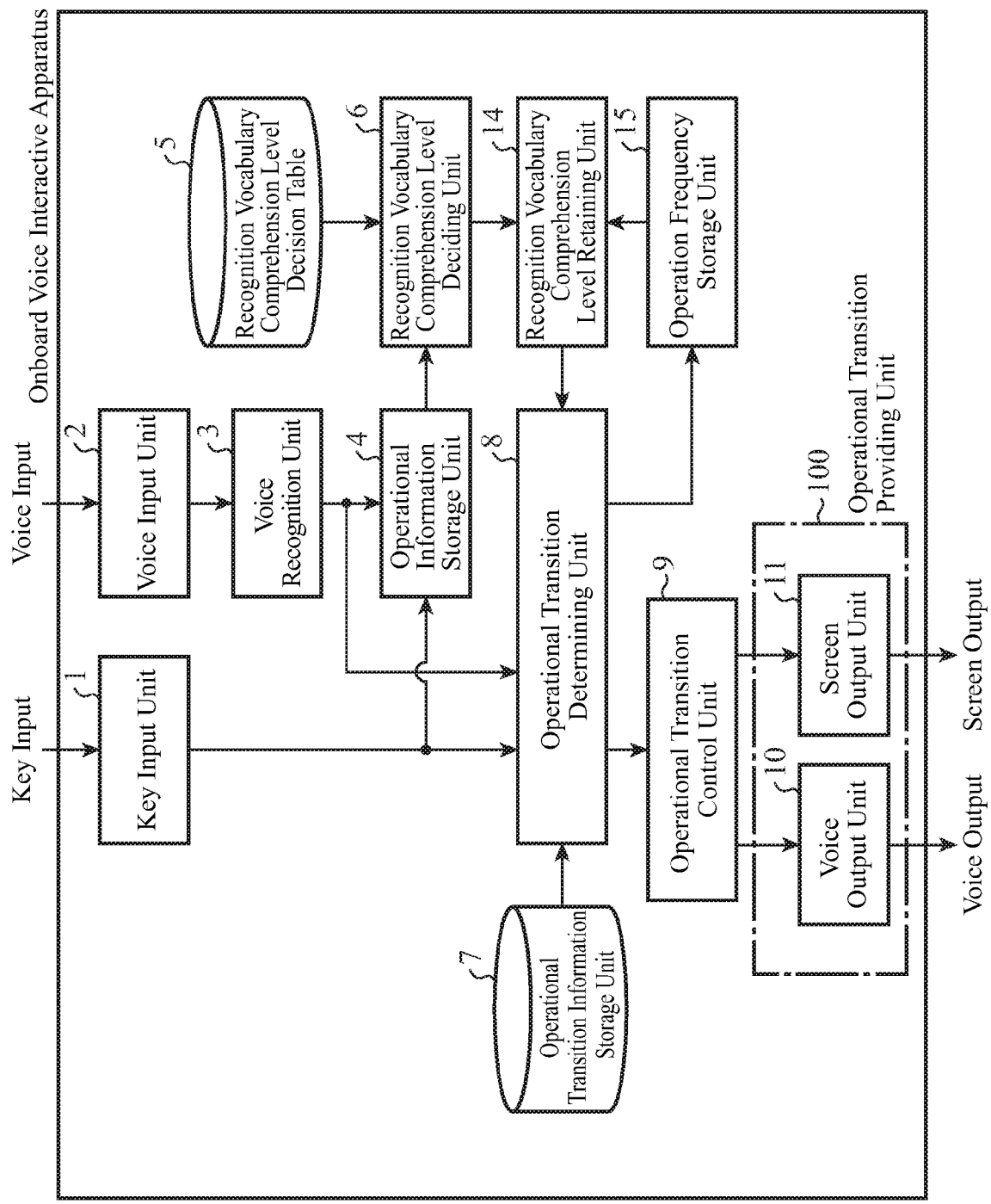
FIG. 11 is a block diagram showing an example of an onboard voice interactive apparatus of an embodiment 4.

FIG. 11 is a block diagram showing an example of the onboard voice interactive apparatus of an embodiment 4 in accordance with the present invention. Incidentally, the same components as those described in the embodiments 1-3 are designated by the same reference numerals and their duplicate description will be omitted. As compared with the embodiment 1, the embodiment 4 described below further comprises a recognition vocabulary comprehension level retaining unit 14 that temporarily stores the recognition vocabulary comprehension level decided, and an operation frequency storage unit 15 that counts and stores the user operation frequency in the operational transition after the alteration of the operational transition, and it does not alter the operational transition again for a prescribed period of time (until the operation frequency exceeds a prescribed number of times) after the alteration of the operational transition by continuously using the recognition vocabulary comprehension level before the alteration.

Figure 12:
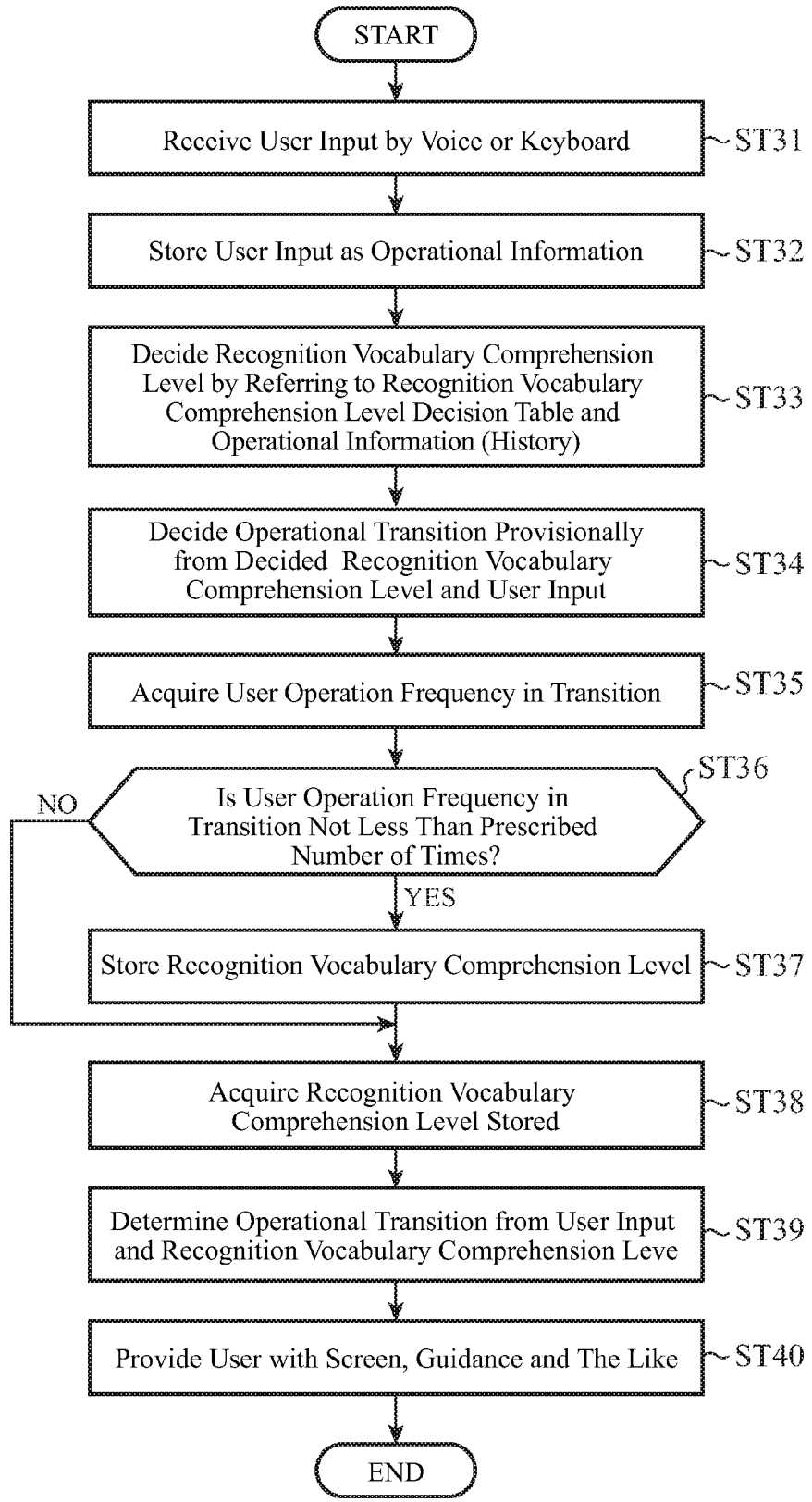
FIG. 12 is a flowchart showing the operation of the embodiment 4.

Next, the operation will be described. FIG. 12 is a flowchart showing the operation of the embodiment 4. As for the reception of the user input by voice or key operation (step ST31) and the processing up to the decision of the recognition vocabulary comprehension level (step ST32 and step ST33), since they are the same as those of the embodiment 1, their description will be omitted. After the decision of the recognition vocabulary comprehension level, the operational transition determining unit 8 provisionally decides the operational transition corresponding to the recognition vocabulary comprehension level and the user input (step ST34). Then it acquires the user operation frequency in the transition (step ST35). Next, if the user operation frequency acquired is not less than a prescribed number of times (YES at step ST36), the recognition vocabulary comprehension level decided at step ST33 is stored in the recognition vocabulary comprehension level retaining unit 14 (step ST37). On the other hand, if the user operation frequency is less than the prescribed number of times (NO at step ST36), the recognition vocabulary comprehension level is not stored. Thus, the recognition vocabulary comprehension level retaining unit 14 does not store the recognition vocabulary comprehension level decided at step ST33, but retains the recognition vocabulary comprehension level before that so that the recognition vocabulary comprehension level is not altered. Then the operational transition determining unit 8 acquires the recognition vocabulary comprehension level finally stored (step ST38), and determines the operational transition corresponding to the recognition vocabulary comprehension level and the user input (step ST39). Thus, it gives the user the screen output and voice output such as guidance in accordance with the operational transition determined and the input content (step ST40).

Incidentally, although the embodiment 4 is configured in such a manner that it does not alter the recognition vocabulary comprehension level for a prescribed period of time after the operational transition alteration even if the recognition vocabulary comprehension level is altered in accordance with the decision result of the recognition vocabulary comprehension level deciding unit, another configuration is also possible which does not alter the operational transition for a prescribed period of time after the operational transition alteration even if the recognition vocabulary comprehension level is altered.

As described above, according to the present embodiment 4, it is configured in such a manner that for the prescribed period of time after the operational transition alteration (until the operation frequency exceeds the prescribed number of times), it does not alter the recognition vocabulary comprehension level, or does not to alter the operational transition even if the recognition vocabulary comprehension level is altered. Accordingly, it can prevent inappropriate decision results from taking place owing to a factor unrelated to the recognition vocabulary comprehension level such as mere inexperience of the user.

Embodiment 5

Figure 13:
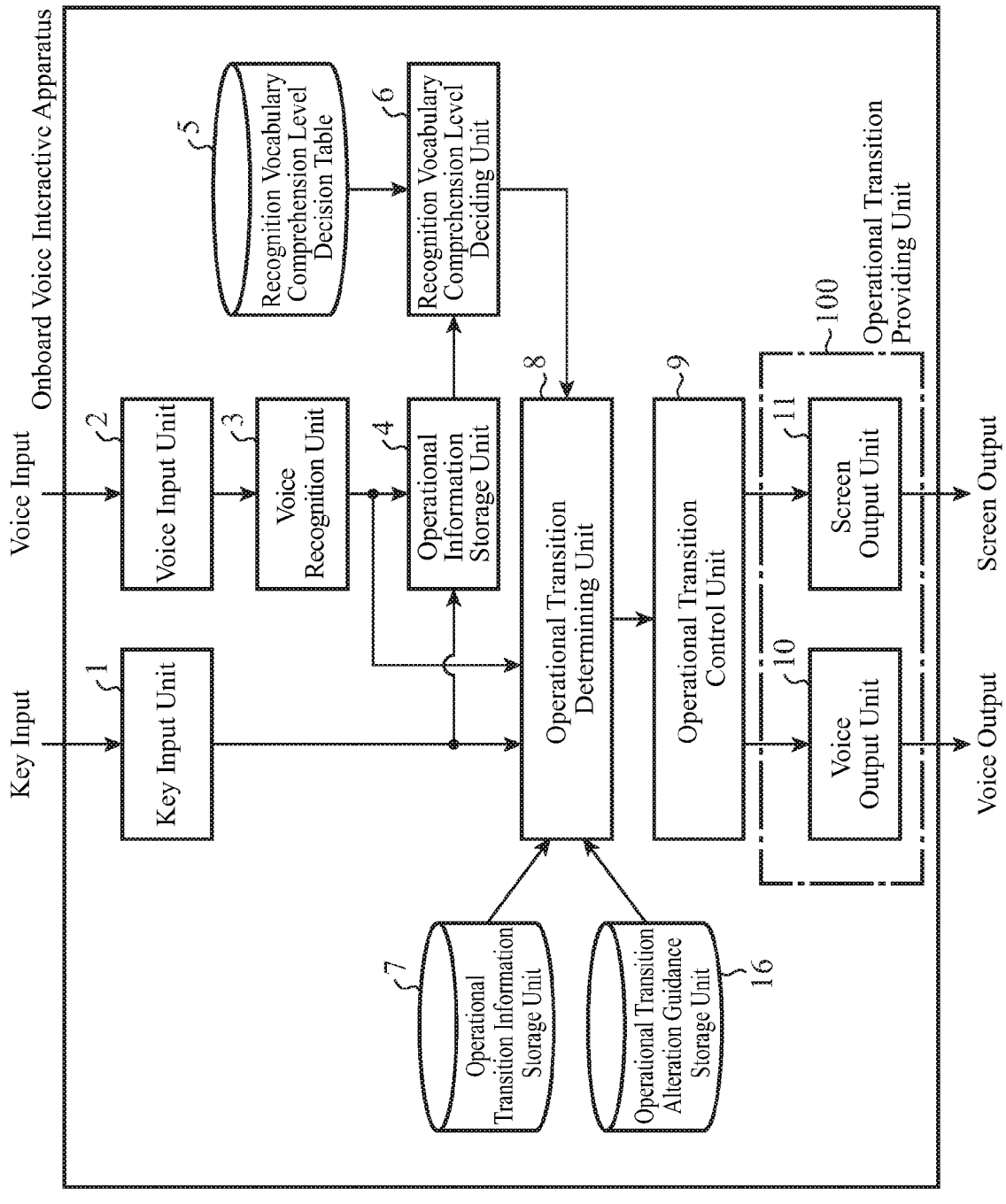
FIG. 13 is a block diagram showing an example of an onboard voice interactive apparatus of an embodiment 5.

FIG. 13 is a block diagram showing an example of the onboard voice interactive apparatus of an embodiment 5 in accordance with the present invention. Incidentally, the same components as those described in the embodiments 1-4 are designated by the same reference numerals and their duplicate description will be omitted. As compared with the embodiment 1, the present embodiment 5 further comprises an operational transition alteration guidance storage unit 16 that stores guide information about the operational transition alteration content by means of a screen telop and voice guidance, and provides a user with information that the operational transition is changed at the operational transition alteration and with information about the manner the operational transition is changed.

An example will be described using the operational transition for each recognition vocabulary comprehension level shown in FIG. 5. When the recognition vocabulary comprehension level deciding unit 6 alters the recognition vocabulary comprehension level of the user from 3 to 2, the operational transition determining unit 8 changes the operational transition from the facility search-3 of FIG. 5(c) to the facility search-2 of FIG. 5(b). On this occasion, the input method is altered from the single-step input of the combination of "place plus genre" to the two-step input of "place" and "genre" separately. Thus at the timing of the operational transition alteration, an operational transition alteration guidance such as "operational transition is changed so as to utter place and then genre" is given to the user.

Figure 14:
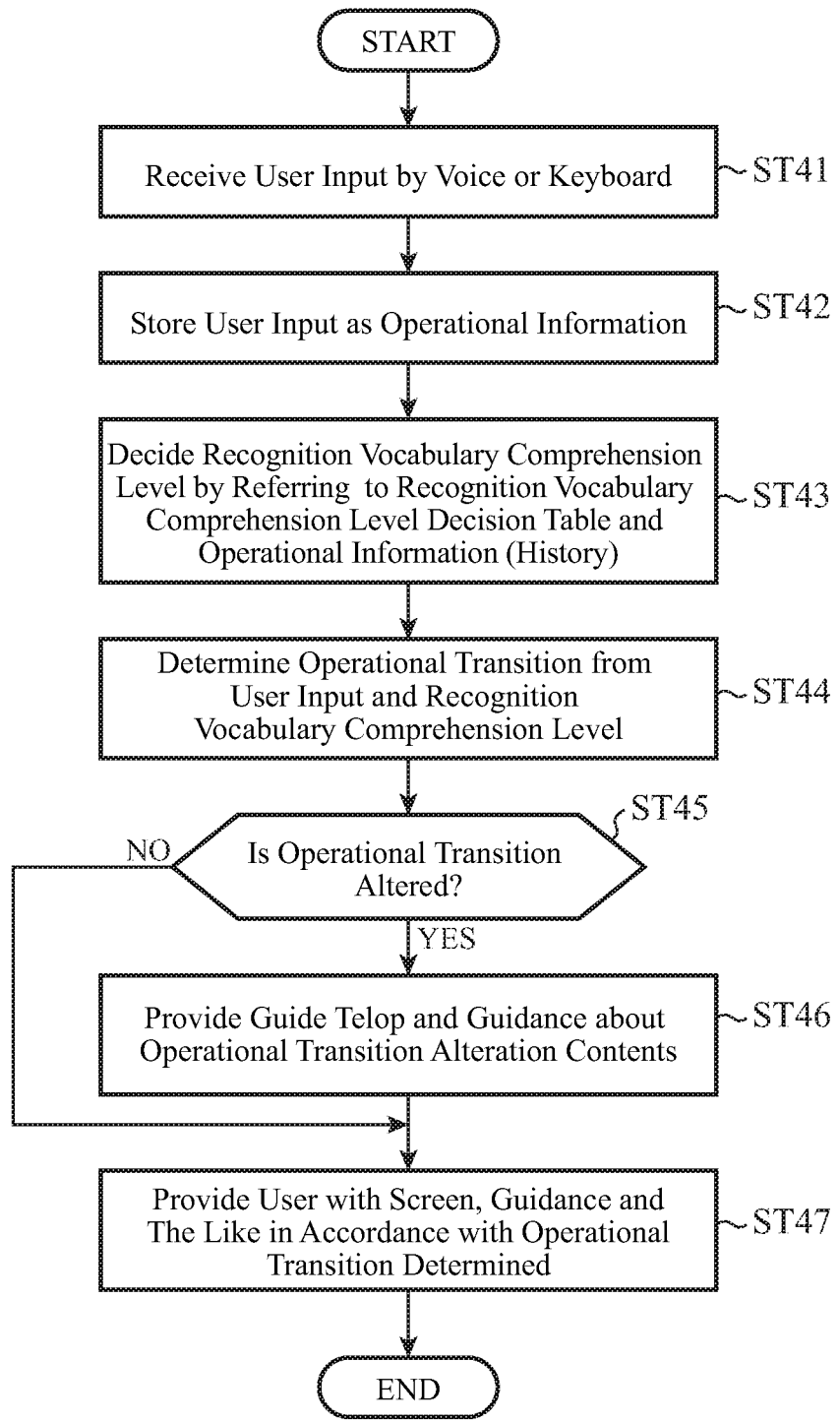
FIG. 14 is a flowchart showing the operation of the embodiment 5.

Next, the operation will be described. FIG. 14 is a flowchart showing the operation of the embodiment 5. Since the processing from the reception of the user input by voice or key operation (step ST41) to the determination of the operational transition (step ST44) is the same as that of the embodiment 1, its description will be omitted. After the determination of the operational transition at step ST44, the operational transition determining unit 8 decides on whether the operational transition is altered or not (step ST45). Unless the operational transition is altered (NO at step ST45), the screen output and voice output such as a guidance is provided to the user in accordance with the previously determined operational transition as in the embodiment 1 (step ST47). On the other hand, when the operational transition is altered (YES at step ST45), the operational transition determining unit 8 acquires the guide information about the alteration content from the operational transition alteration guidance storage unit 16 before altering to the previously determined operational transition, and provides the user with the operational transition alteration guidance using a screen telop, voice guidance or the like (step ST46). After that, it alters to the previously determined operational transition, and provides the user with the screen output and voice output such as guidance in accordance with the operational transition (step ST47).

As described above, according to the present embodiment 5, before the operational transition is altered, it provides the user with the information about to which type of the operational transition it is altered. Accordingly, it can prevent the user from being confused owing to abrupt alteration of the operational transition, and can quicken the adaptation of the user to the operational transition after the alteration.

Embodiment 6

Although the embodiments 1-5 alter the operational transition in accordance with the recognition vocabulary comprehension level, the embodiment 6 is configured in such a manner as to enable a user to alter the operational transition.

For example, when the recognition vocabulary comprehension level rises and the operational transition is altered to the one with the smaller number of input steps, and if the user wishes to continually use the easy-to-understand operational transition although the number of input steps increases a little, it is also possible to enable the user to cancel the alteration. As for a method of the cancellation, any method can be used such as providing a cancellation button for the user to push it, inquiring whether the user "accepts the operational transition alteration or not" by voice to make the user reply "yes" or "no" by voice, etc.

Incidentally, as for the block diagram of the onboard voice interactive apparatus of the embodiment 6, since it is the same as that of the configuration shown in FIG. 1 described in the embodiment 1, the description will be omitted.

Figure 15:
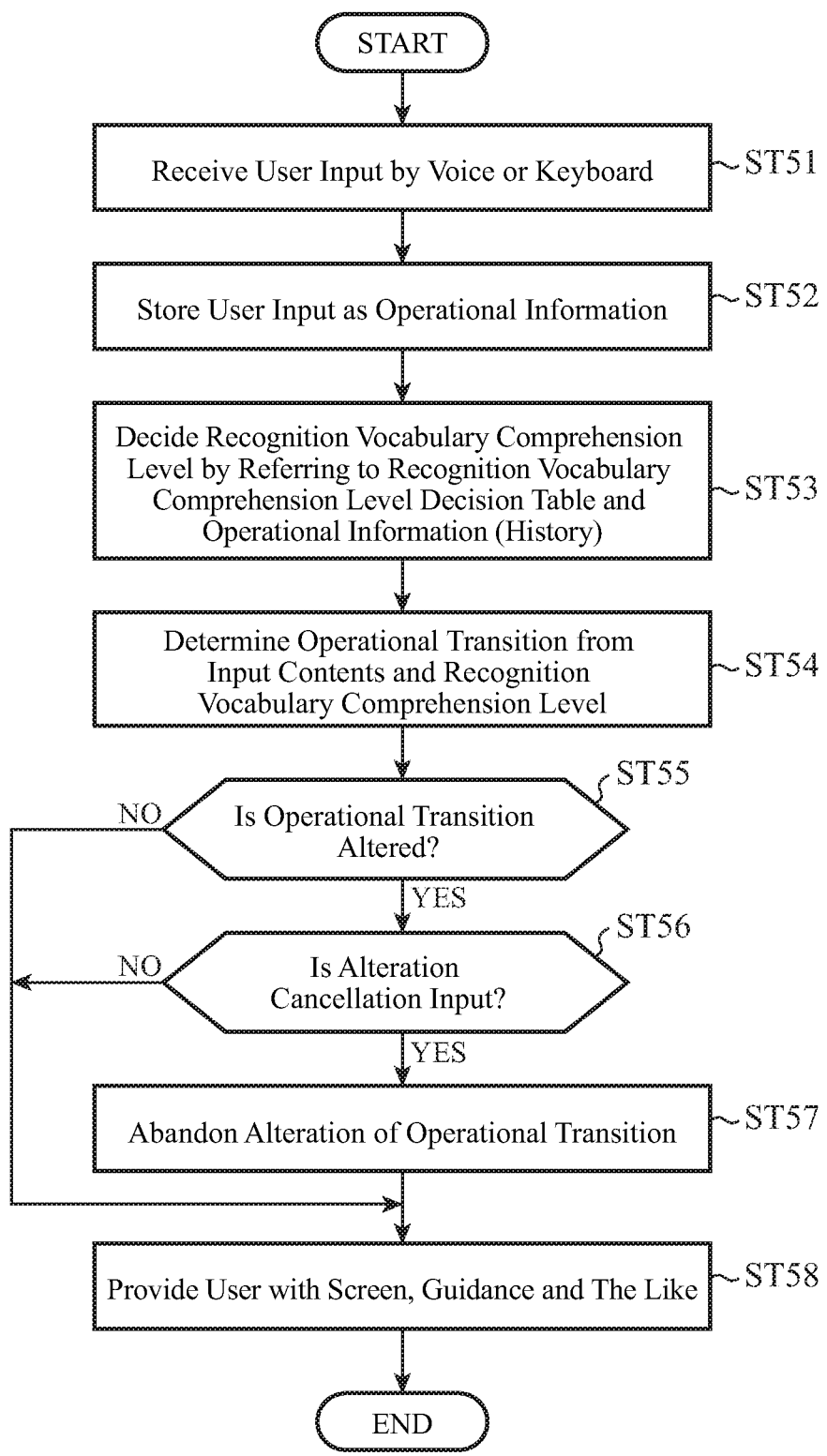
FIG. 15 is a flowchart showing the operation when a user cancels an operational transition alteration at the time of the operational transition alteration in an embodiment 6.

FIG. 15 is a flowchart showing the operation when the user cancels out the operational transition alteration at the time of the operational transition alteration. Since the processing from the reception of the user input by voice or key operation (step ST51) to the decision of the operational transition (step ST54) is the same as that of the embodiment 1, its description will be omitted. However, when the operational transition is altered according to the operational transition determined at step ST54 (YES at step ST55), the user input is received again, and a decision is made as to whether the user inputs the cancellation of the alteration or not (step ST56). When the alteration is canceled (YES at step ST56), the alteration of the operational transition is abandoned (step ST57). Then the user is provided with the same screen output and voice output such as guidance in accordance with the same operational transition as before (previous to the alteration of the operational transition) (step ST58). On the other hand, unless the alteration is canceled (NO at step ST56), the user is provided with the screen output and voice output such as guidance in accordance with the operational transition altered (step ST58).

Figure 16:
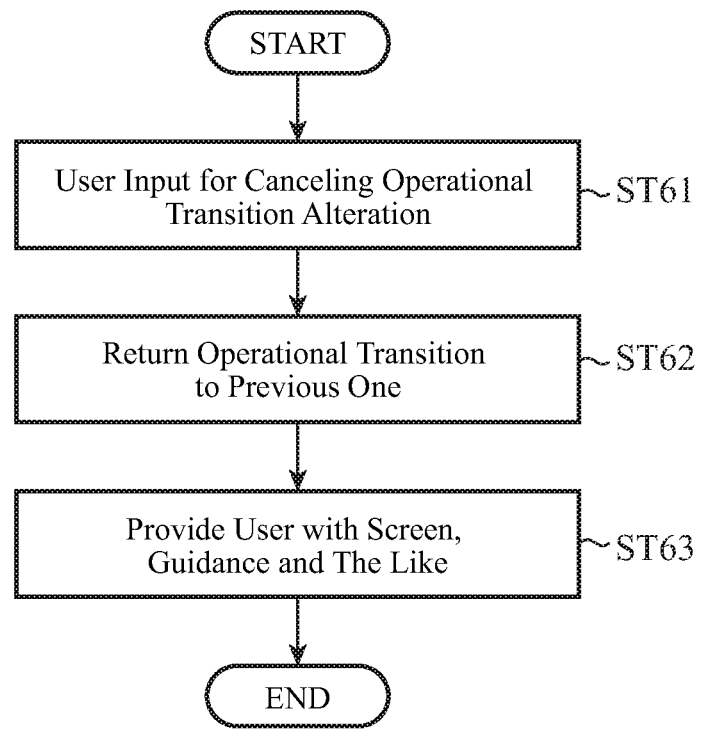
FIG. 16 is a flowchart showing the operation when a user undoes the operational transition alteration at arbitrary timing in the embodiment 6.

Furthermore, a configuration is also possible which enables the user to return to the operational transition before the alteration not only when the operational transition is altered, but also at an arbitrary timing (even after a certain time has elapsed from the alteration of the operational transition). FIG. 16 is a flowchart showing the operation when the user returns the operational transition to that before the alteration at an arbitrary timing. First, the user input for canceling the operational transition alteration is received and processed (step ST61), and the operational transition determining unit 8 returns the operational transition to the one before the alteration (step ST62). Then the screen output and the voice output such as guidance are provided to the user in accordance with the previous operational transition (step ST63).

As described above, according to the present embodiment 6, it enables the user to cancel the alteration of the operational transition at the time of the operational transition alteration, thereby being able to prevent the alteration of the operational transition contrary to the expectation of the user. In addition, it enables the user to return the operational transition to the one before the alteration at an arbitrary timing, thereby being able to return to the operational transition before the alteration always when the user cannot adapt to the operational transition after the alteration or the like.

Embodiment 7

Figure 17:
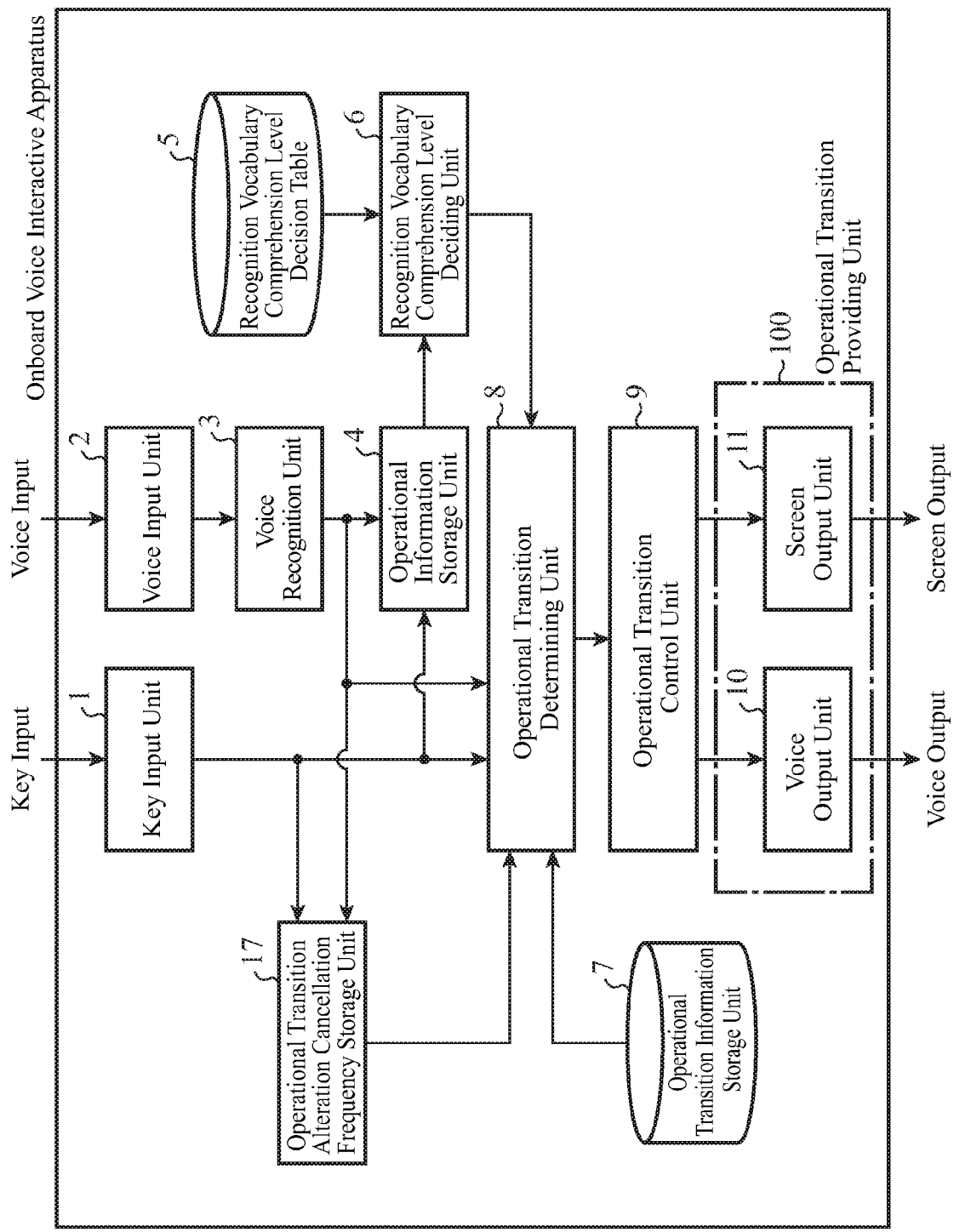
FIG. 17 is a block diagram showing an example of an onboard voice interactive apparatus of an embodiment 7.

FIG. 17 is a block diagram showing an example of the onboard voice interactive apparatus of an embodiment 7 in accordance with the present invention. Incidentally, the same components as those described in the embodiments 1-6 are designated by the same reference numerals and their duplicate description will be omitted. The embodiment 7 described below further comprises in addition to the embodiment 6 an operational transition alteration cancellation frequency storage unit 17 that counts and stores the alteration cancellation frequency for each operational transition, and determines the operational transition, taking account of the operational transition alteration cancellation frequency of each operational transition such as excluding the operational transition which undergoes the cancellation of alteration not less than a prescribed number of times by the user, or which is returned to the previous one after the alteration not less than a prescribed number of times.

Figure 18:
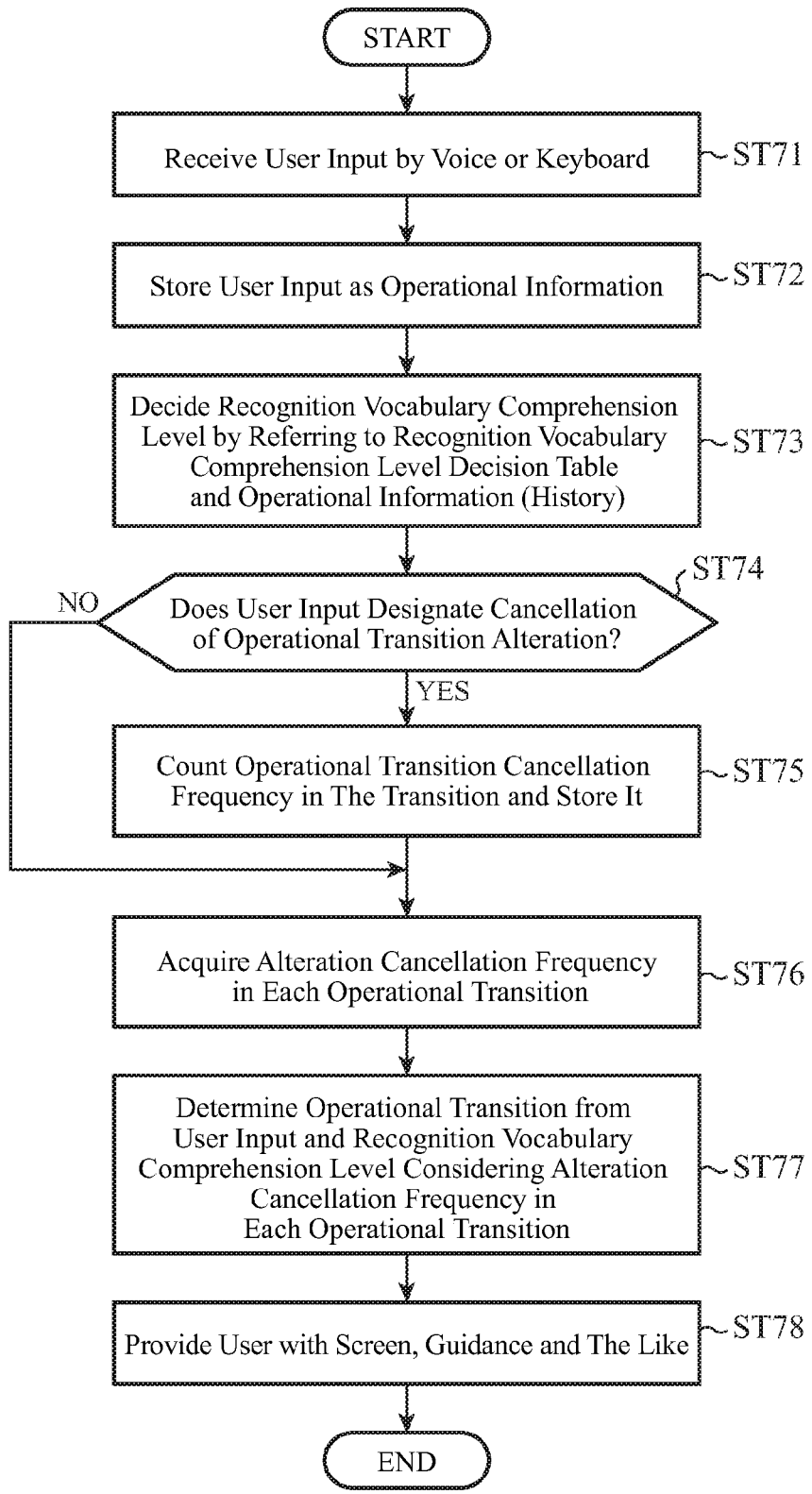
FIG. 18 is a flowchart showing the operation of the embodiment 7.

Next, the operation will be described. FIG. 18 is a flowchart showing the operation of the embodiment 7. As for the processing from the reception of the user input by voice or key operation (step ST71) to the decision of the recognition vocabulary comprehension level (step ST73) and the processing after the determination of the operational transition (step ST78), since they are the same as those of the embodiment 1, their description will be omitted. After the recognition vocabulary comprehension level is decided and when the user input cancels the operational transition after its alteration or returns it to the previous operational transition after the alteration (the two events are both referred to as "operational transition alteration cancellation" from now on) (YES at step ST74), the operational transition alteration cancellation frequency storage unit 17 counts and stores the operational transition alteration cancellation frequency in the transition (step ST75). Unless the user input is the operational transition alteration cancellation (NO at step ST74), it does not execute the processing of storing at step ST75. After that, the operational transition determining unit 8 acquires the alteration cancellation frequency in each operational transition (step ST76), and determines the operational transition from the user input and the recognition vocabulary comprehension level, taking account of the alteration cancellation frequency of each operational transition (step ST77). Here, the phrase "taking account of the alteration cancellation frequency of each operational transition" means that as for the operational transition which undergoes the cancellation of the user not less than the prescribed number of times, or which is returned to the previous operational transition after the alteration not less than the prescribed number of times by the user, it is interpreted to be an operational transition the user does not desire, and is removed from a target to which the operational transition is to be altered so that it is not determined as the operational transition for a prescribed period of time or permanently.

As described above, according to the present embodiment 7, as for the operational transition which undergoes the cancellation of its alteration not less than prescribed number of times, or which is returned to its previous operational transition after the alteration of the operational transition not less than the prescribed number of times, it removes these operational transitions, which undergo the cancellation of the alteration, from the operational transition alteration target for the predetermined period of time or permanently. Accordingly, it can eliminate the uncomfortableness of the user due to a second alteration to the operational transition the user does not desire. Accordingly it can provide the user with a comfortable operational transition.

Embodiment 8

Figure 19:
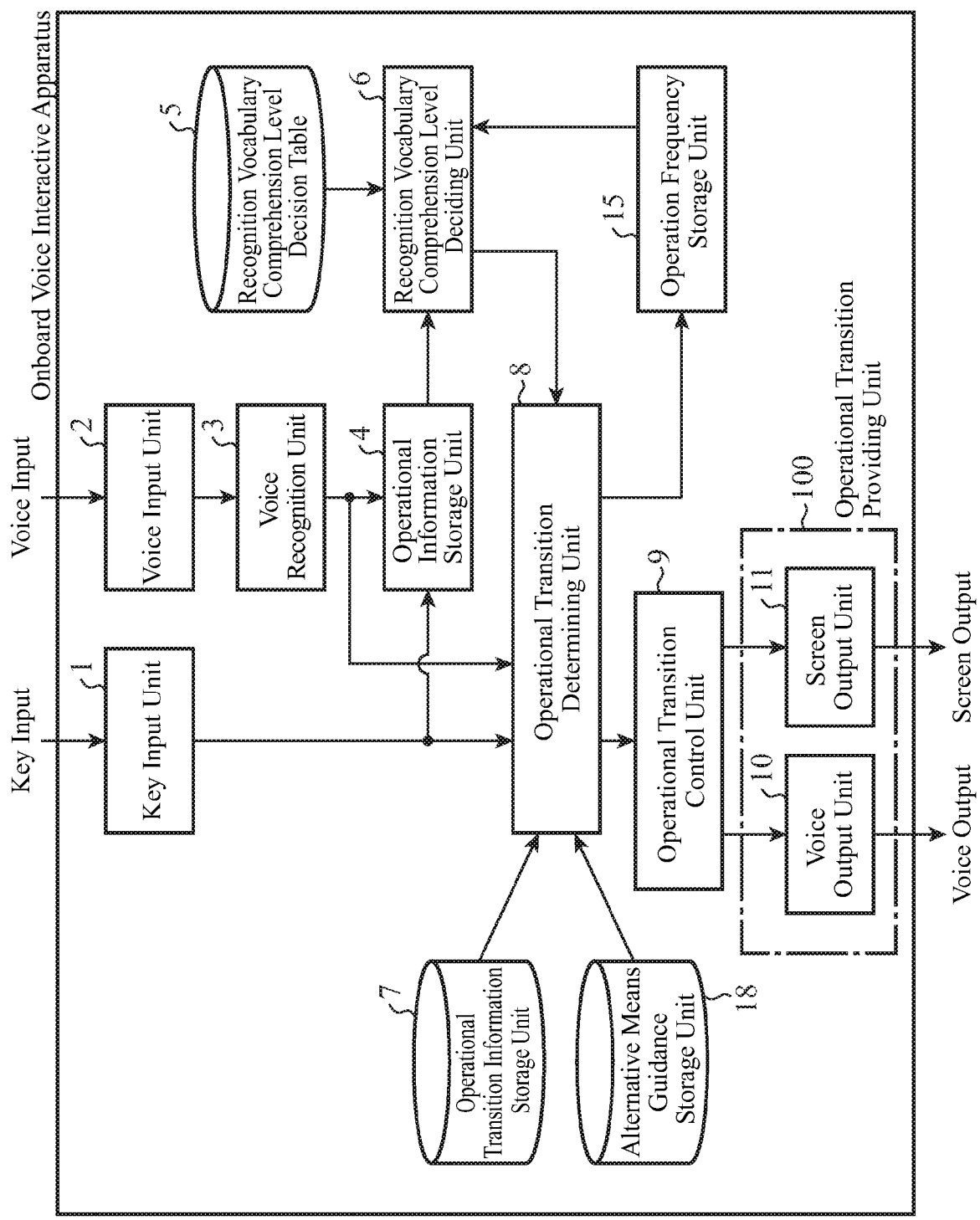
FIG. 19 is a block diagram showing an example of an onboard voice interactive apparatus of an embodiment 8.

FIG. 19 is a block diagram showing an example of the onboard voice interactive apparatus of an embodiment 8 in accordance with the present invention. Incidentally, the same components as those described in the embodiments 1-7 are designated by the same reference numerals and their duplicate description will be omitted. As compared with the embodiment 1, the embodiment 8 described below further comprises an operation frequency storage unit 15 and an alternative means guidance storage unit 18. Then, if it does not produce any effect (the recognition vocabulary comprehension level is not improved) for a prescribed period of time (when the user operation frequency in the transition exceeds a prescribed number of times) after the alteration to the easiest-to-understand operational transition (the facility search-1 shown in FIG. 5(*a*) in the operational transition of FIG. 5, for example), the present embodiment provides a user with an alternative means such as an alternative transition capable of achieving the same object with a different function, an alternative transition based on a key operation (manual operation) rather than the voice operation, giving more detailed guidance without changing the operational transition, or prompting a user to refer to a more detailed manual. The operation frequency storage unit 15 counts and stores the user operation frequency in each operational transition as described in the embodiment 4. In addition, the alternative means guidance storage unit 18 stores guide information by means of a screen, guidance and the like relating to an alternative means, which includes an alternative transition capable of achieving the same object with a different function, a key operation (manual operation) other than the voice operation, a means that prompts to refer to a manual and the like.

Figure 20:
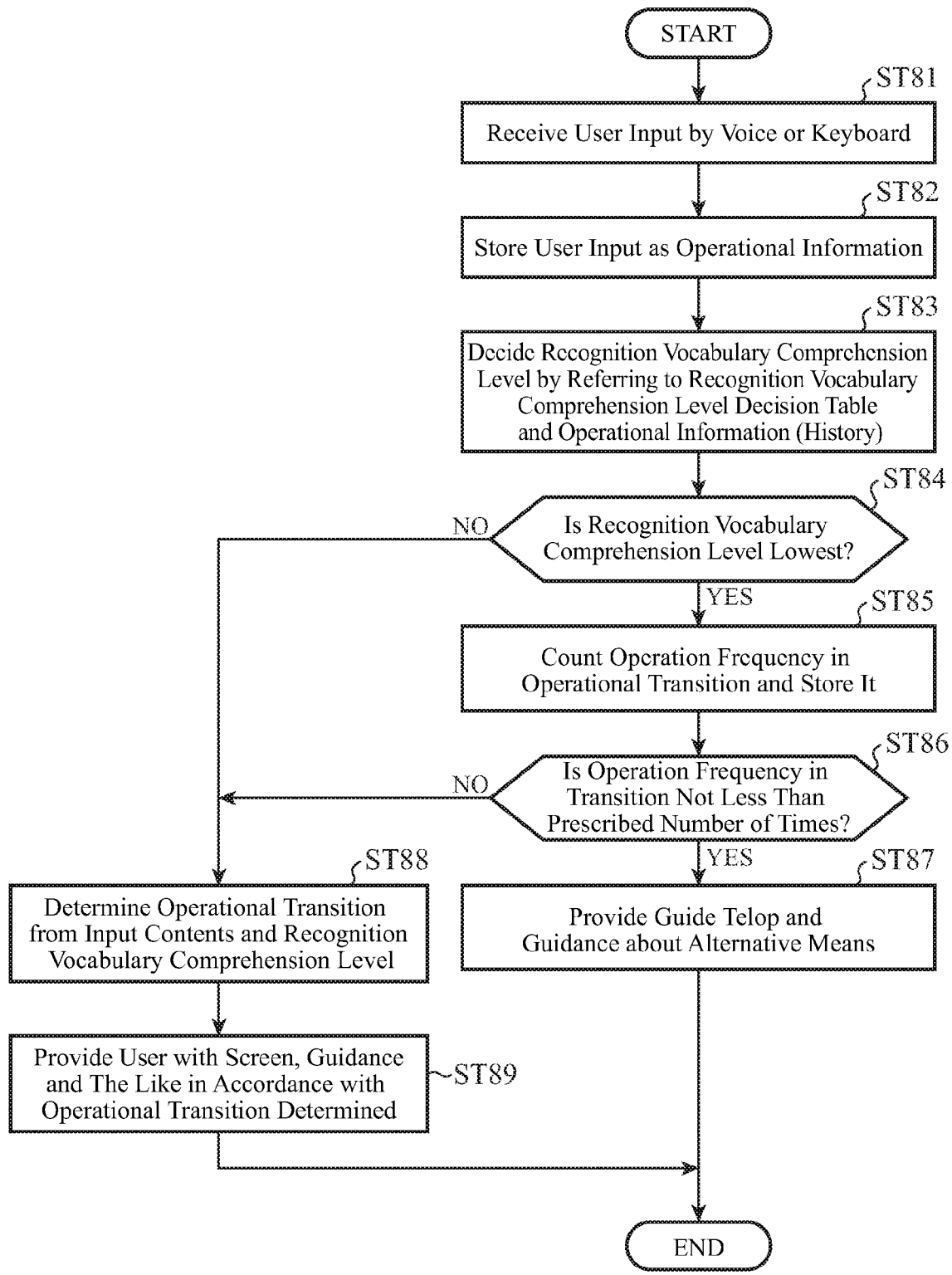
FIG. 20 is a flowchart showing the operation of the embodiment 8.

Next, the operation will be described. FIG. 20 is a flowchart showing the operation of the embodiment 8. As for the reception of the user input by voice or key operation (step ST81) and the processing up to the decision of the recognition vocabulary comprehension level (step ST82 and step ST83), since they are the same as those of the embodiment 1, their description will be omitted. In the present embodiment 8, however, if the recognition vocabulary comprehension level after the decision of the recognition vocabulary comprehension level is at the lowest level (YES at step ST84), the operation frequency storage unit 15 counts the user operation frequency in the operational transition and stores it (step ST85). Next, if the user operation frequency counted in the transition is not less than a prescribed number of times (YES at step ST86), a screen telop for guidance and voice guidance relating to the alternative means as described above are provided to the user (step ST87). On the other hand, unless the recognition vocabulary comprehension level decided at step ST83 is the lowest (NO at step ST84) or if the count of the user operation frequency in the transition at step ST85 is less than the prescribed number of times (NO at step ST86), the operational transition determining unit 8 determines the operational transition corresponding to the user input content and the recognition vocabulary comprehension level as in the embodiment 1 (step ST88), and provides the user with the screen output and voice output of the guidance in accordance with the operational transition determined and the input content (step ST89).

As described above, according to the present embodiment 8, it is configured in such a manner that it provides a user with an alternative means of the operational transition when the recognition vocabulary comprehension level is not improved even if the prescribed period of time has elapsed after the alteration to the easiest-to-understand operational transition. Accordingly, even if there is a basic problem such as a user has merely limited comprehension of the voice recognition function itself or the voice input unit does no operate normally, it can increase the possibility for the user to achieve the task and lead to the solution of the basic problem by providing the user with the alternative means such as an alternative transition capable of achieving the same object with a different function, an alternative transition by the key operation (manual operation) other than the voice operation, a means for providing more detailed guidance using the same operational transition, and a means for prompting the user to refer to a more detailed manual.

Embodiment 9

Figure 21:
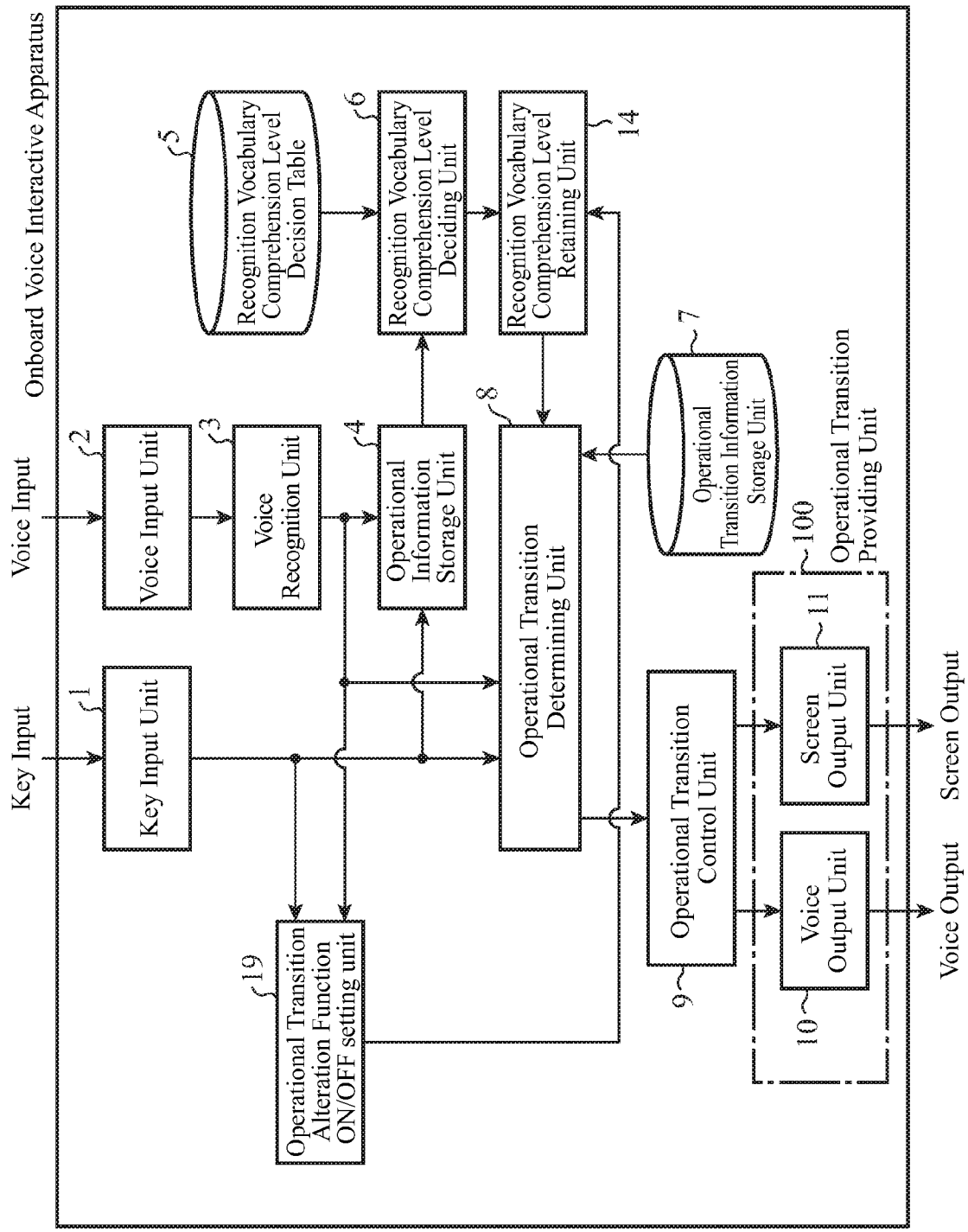
FIG. 21 is a block diagram showing an example of an onboard voice interactive apparatus of an embodiment 9.

FIG. 21 is a block diagram showing an example of the onboard voice interactive apparatus of an embodiment 9 in accordance with the present invention. Incidentally, the same components as those described in the embodiments 1-8 are designated by the same reference numerals and their duplicate description will be omitted. As compared with the embodiment 1, the embodiment 9 described below further comprises an operational transition alteration function ON/OFF setting unit 19 that can enable or disable the operational transition alteration function in accordance with the input by a key operation (manual operation) or voice. Thus, the user has the option of doing the alteration of the operational transition or not. If the user does not want the operational transition altered, he or she sets the operational transition alteration function ON/OFF setting unit at OFF, which prevents the operational transition determining unit 8 from carrying out the alteration of the operational transition.

Figure 22:
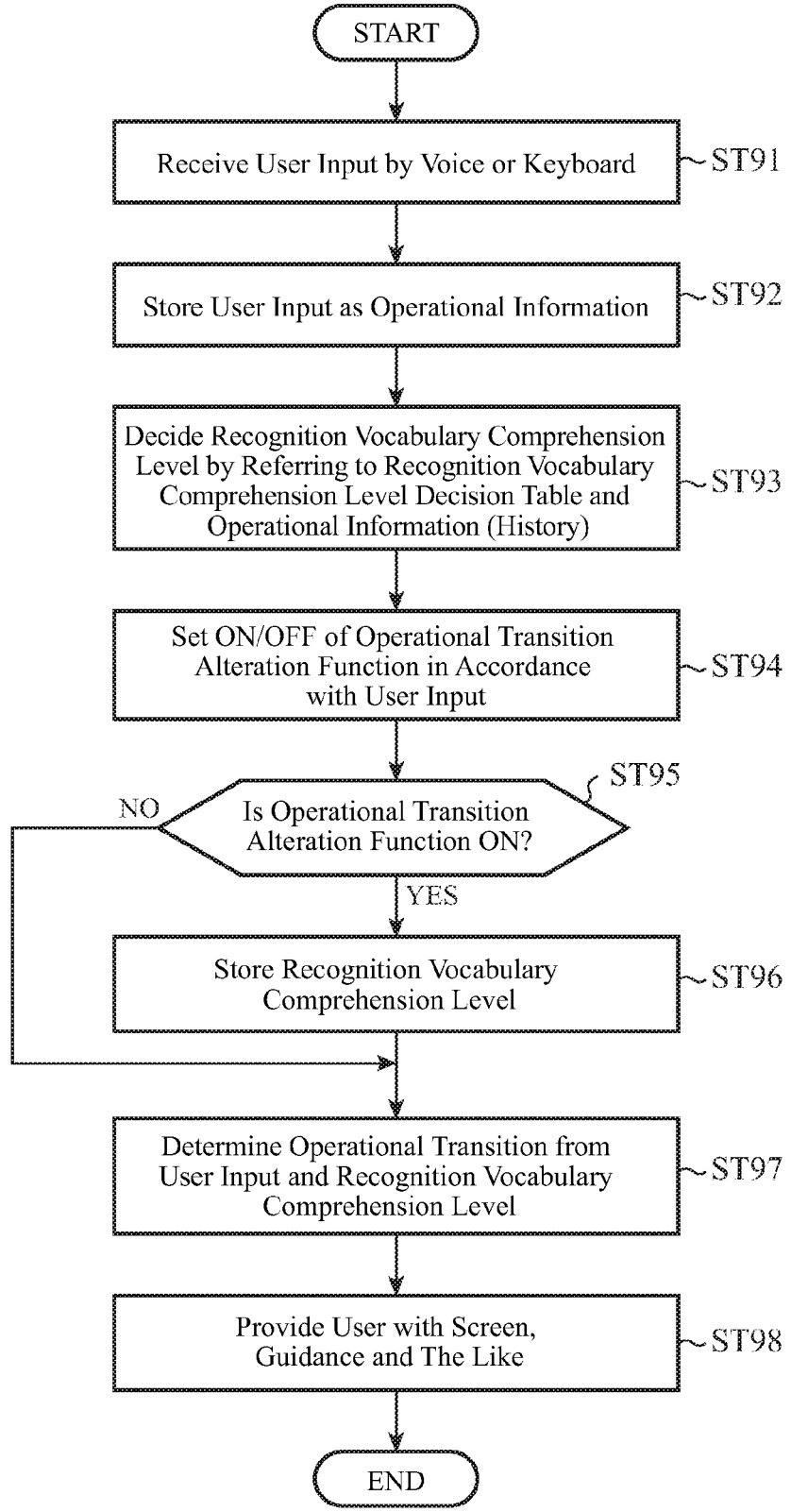
FIG. 22 is a flowchart showing the operation of the embodiment 9.

Next, the operation will be described. FIG. 22 is a flowchart showing the operation of the embodiment 9. As for the processing from the reception of the user input by voice or key operation (step ST91) up to the decision of the recognition vocabulary comprehension level (step ST93) and the processing after the determination of the operational transition (step ST98), since they are the same as those of the embodiment 1, their description will be omitted. After the decision of the recognition vocabulary comprehension level, the operational transition alteration function ON/OFF setting unit 19 sets the ON/OFF of the operational transition alteration function in accordance with the user input (step ST94). Next, if the setting of the operational transition alteration function is ON (YES at step ST95), the recognition vocabulary comprehension level retaining unit 14 stores the recognition vocabulary comprehension level (step ST96), and if the setting is OFF (NO at step ST95), it does not store the recognition vocabulary comprehension level. After that, the operational transition determining unit 8 determines the operational transition from the finally stored recognition vocabulary comprehension level and from the user input (step ST97). Here, when the setting of the operational transition alteration function is OFF, the finally stored recognition vocabulary comprehension level corresponds to the operational transition immediately before the change into the OFF state.

As described above, according to the present embodiment 9, it enables the user to select to perform the alteration of the operational transition or not by the operational transition determining unit. Accordingly, when the user wishes to continue using, even if the recognition vocabulary comprehension level is altered, the operational transition previous to the alteration, it can eliminate the unnecessary alteration of the operational transition for the user.

Embodiment 10

Figure 23:
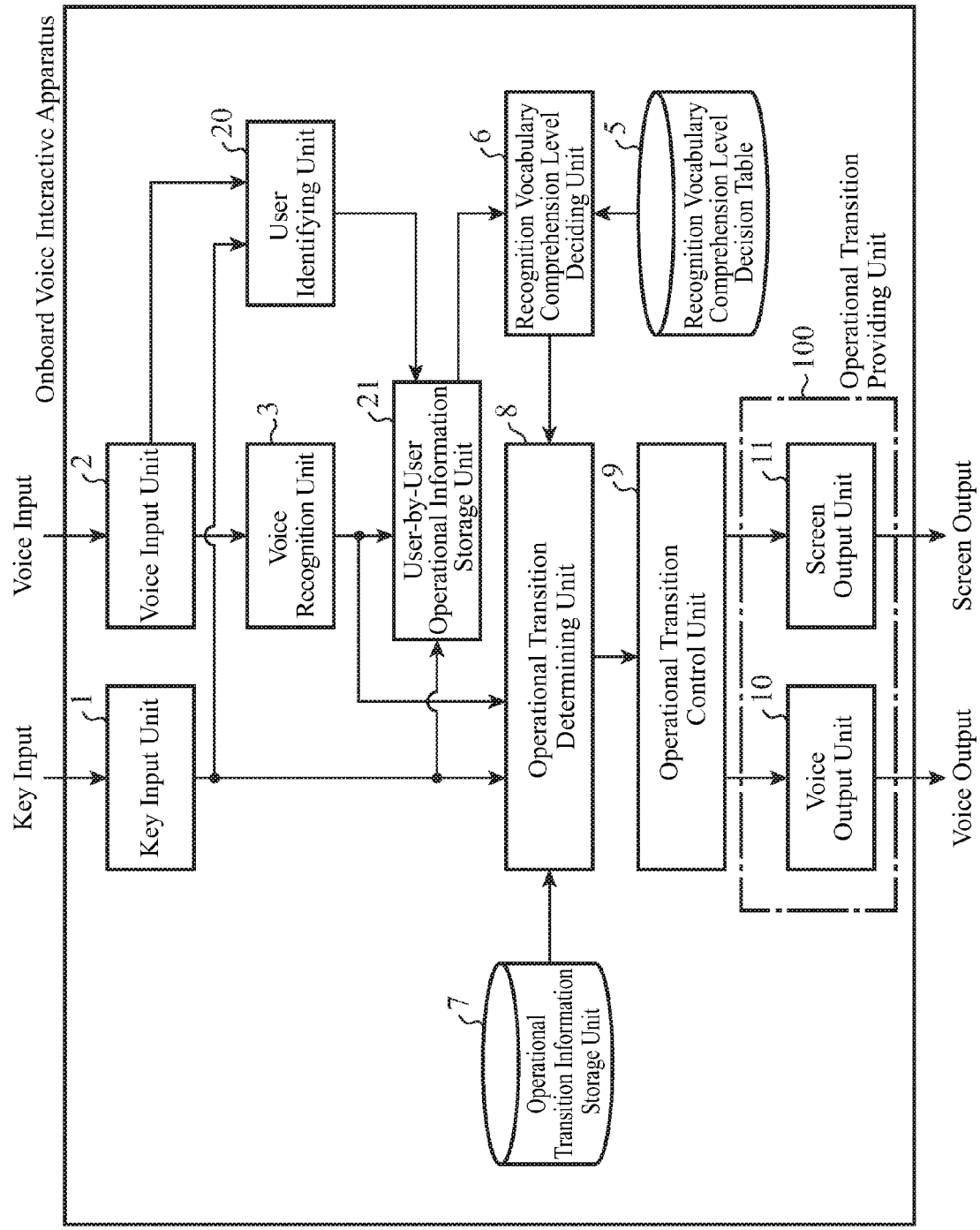
FIG. 23 is a block diagram showing an example of an onboard voice interactive apparatus of an embodiment 10.

FIG. 23 is a block diagram showing an example of the onboard voice interactive apparatus of an embodiment 10 in accordance with the present invention. Incidentally, the same components as those described in the embodiments 1-9 are designated by the same reference numerals and their duplicate description will be omitted. As compared with the embodiment 1, the embodiment 10 described below comprises a user identifying unit 20 that identifies from a key input or from features of the voice input a user who is inputting, and a user-by-user operational information storage unit 21 for storing the operational information for each user instead of the operational information storage unit 4, thereby being able to provide the operational transition suitable for the user. Thus, it decides the recognition vocabulary comprehension level and determines the operational transition user-by-user identified by the user identifying unit 20. Incidentally, although the user identifying unit 20 identifies the user from the key input or from the features of the voice input, the user identifying method is not limited to them. For example, it can use any methods such as using a camera to identify the user from a face image, or a user identification based on a fingerprint.

Figure 24:
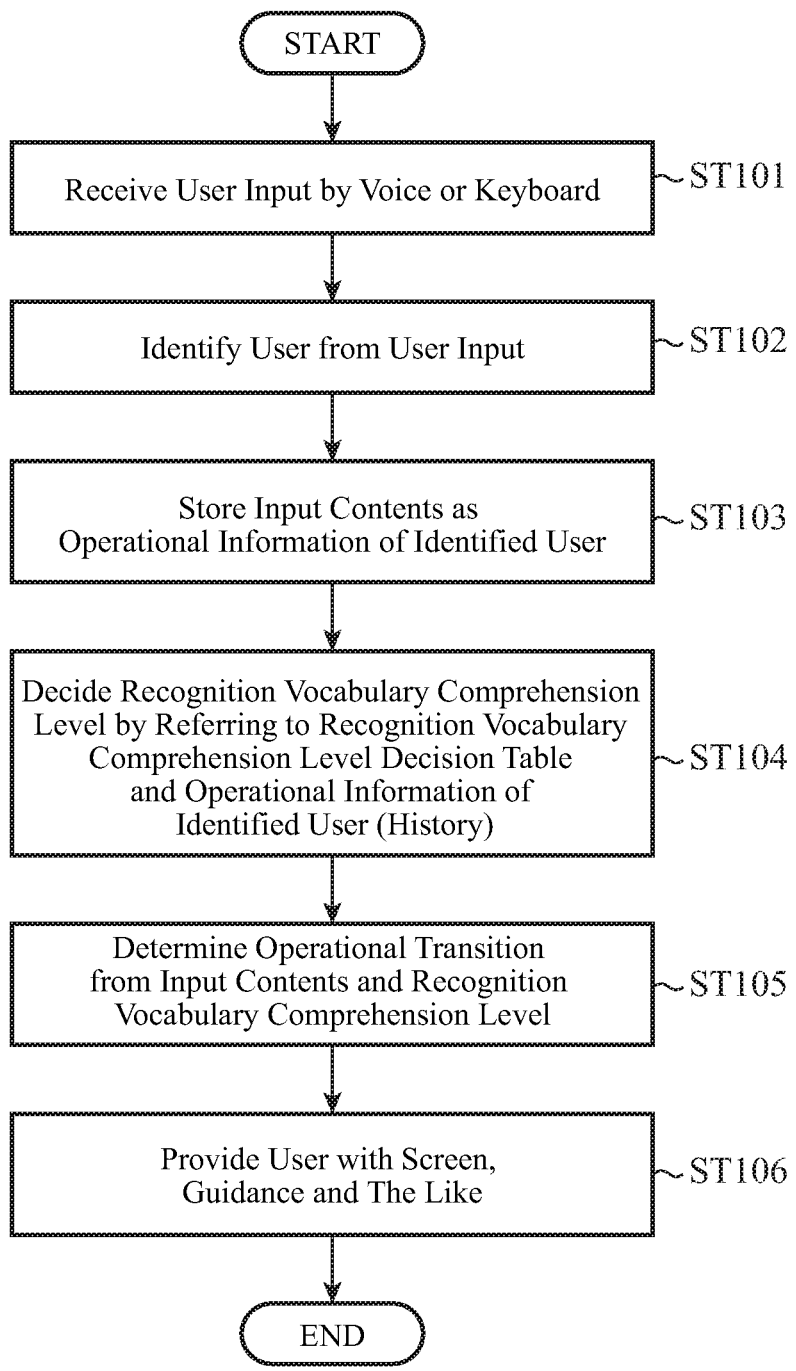
FIG. 24 is a flowchart showing the operation of the embodiment 10.

Next, the operation will be described. FIG. 24 is a flowchart showing the operation of the embodiment 10. As for the reception processing of the user input by voice or key operation (step ST101) and the processing after the decision of the recognition vocabulary comprehension level (step ST105 and step ST106), since they are the same as those of the embodiment 1, their description will be omitted. The user identifying unit 20 identifies the user from the user input received (the features of the voice input or the user identification number or user name by the key input) (step ST102), and stores the input content into the user-by-user operational information storage unit 21 as the operational information of the user identified (various information items associated with the operation contents and operation) (step ST103). Next, the recognition vocabulary comprehension level deciding unit 6 decides the recognition vocabulary comprehension level by referring to the information about the user from the user-by-user operational information stored (step ST104).

As described above, according to the present embodiment 10, it decides the recognition vocabulary comprehension level and determines the operational transition user-by-user identified by the user identifying unit. Accordingly, when a user changes frequently such as in the case of sharing a car with a family, it can provide the operational transition suitable for each user without causing any problem due to the difference in the recognition vocabulary comprehension level of each user (problem of ease of understanding or comfortableness).

Embodiment 11

Figure 25:
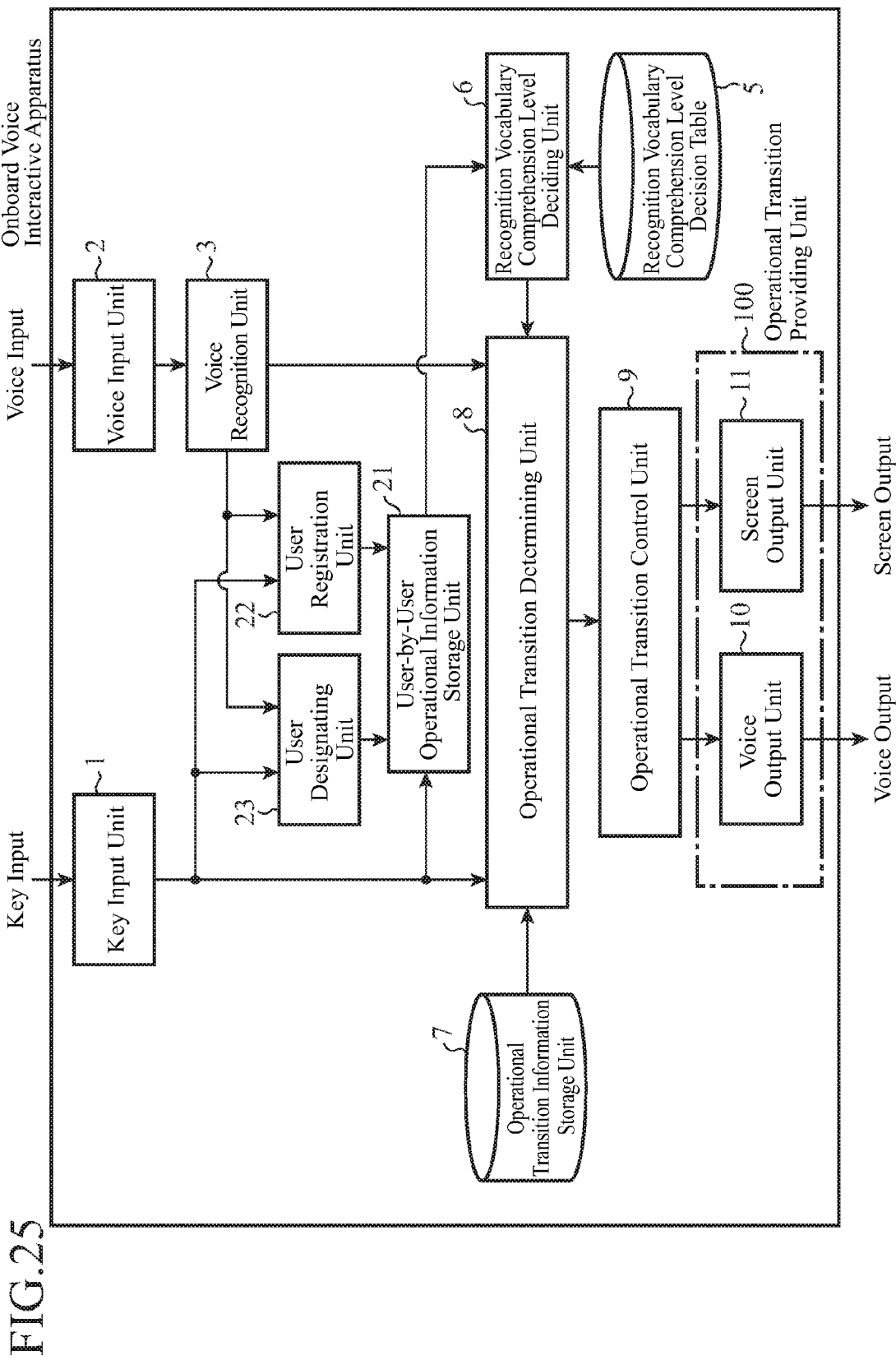
FIG. 25 is a block diagram showing an example of an onboard voice interactive apparatus of an embodiment 11.

FIG. 25 is a block diagram showing an example of the onboard voice interactive apparatus of an embodiment 11 in accordance with the present invention. Incidentally, the same components as those described in the embodiments 1-10 are designated by the same reference numerals and their duplicate description will be omitted. As compared with the embodiment 1, the embodiment 11 described below further comprises a user registration unit 22 that has a user list into which a user can be registered, and a user designating unit 23 that can designate a user freely from among the users registered. In addition, it comprises as in the embodiment 9 the user-by-user operational information storage unit 21 that stores the operational information user-by-user instead of the operational information storage unit 4. Thus, the present embodiment enables a user to designate any user from the user list registered through the user designating unit 23, and decides the recognition vocabulary comprehension level and determines the operational transition for the individual user designated.

Figure 26:
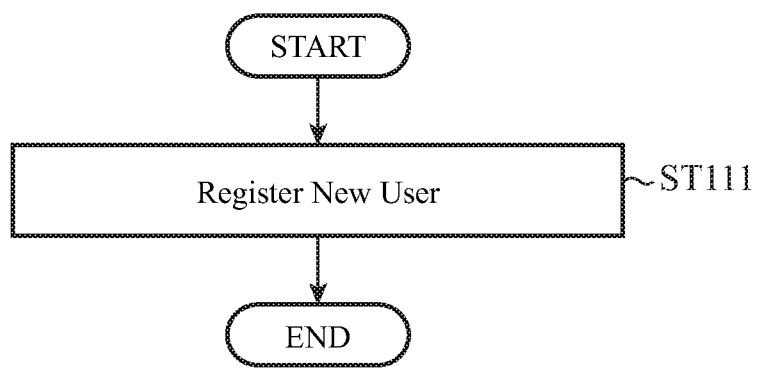
FIG. 26 is a flowchart showing the operation of the embodiment 11 at user registration.

Next, the operation will be described. FIG. 26 is a flowchart showing the operation at the user registration in the embodiment 11. Here, a user is newly registered in the user registration unit 22 by voice or key operation (manual operation) (step ST111).

Figure 27:
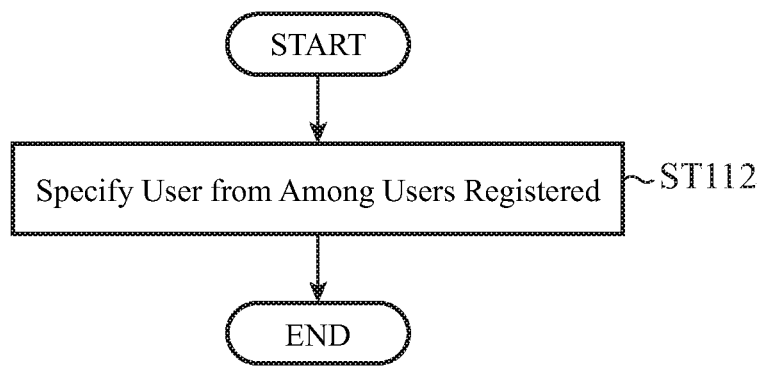
FIG. 27 is a flowchart showing the operation of the embodiment 11 at user selection.

FIG. 27 is a flowchart showing the operation at a user selection in the embodiment 11. Here, it designates a user from among the users registered in the user registration unit 22 through voice or key operation (manual operation), and enables the operational information of the designated user (step ST112).

FIG. 28 is a flowchart showing the basic operation after the user selection by the embodiment 11. As for the reception processing of the user input by voice or key operation (step ST113) and the processing after the decision of the recognition vocabulary comprehension level (step ST116 and step ST117), since they are the same as those of the embodiment 1, their description will be omitted. After the reception of the user input, the input content is stored in the user-by-user operational information storage unit 21 as the operational information about the user designated at step ST112 (step ST114). Next, the recognition vocabulary comprehension level deciding unit 6 decides the recognition vocabulary comprehension level by referring to the information about the designated user from the user-by-user operational information stored (step ST115).

As described above, according to the present embodiment 11, it is configured in such a manner that it enables a user to designate any user from the registered user list through the user designating unit, and decides the recognition vocabulary comprehension level and determines the operational transition for each designated user separately. Thus, when the user changes frequently such as when a family shares a vehicle, it can designate the operational transition for each user explicitly. Accordingly, it can provide the user with the operational transition suitable for each user without causing a problem due to the difference in the recognition vocabulary comprehension level of the user (the problem of ease of understanding or comfortableness).

Incidentally, although the embodiments are described by way of example of the onboard voice interactive apparatus, the navigation apparatus in accordance with the present invention is applicable not only to an onboard apparatus, but also to any apparatus capable of navigating by voice interaction between a user and the apparatus such as a portable navigation apparatus.

Incidentally, it is to be understood that a free combination of the individual embodiments, variations of any components of the individual embodiments or removal of any components of the individual embodiments are possible within the scope of the present invention.

INDUSTRIAL APPLICABILITY

A navigation apparatus in accordance with the present invention can be applied to an onboard voice interactive apparatus and portable navigation apparatus capable of navigating by the voice interaction between a user and the apparatus.

DESCRIPTION OF REFERENCE SYMBOLS

1 key input unit, 2 voice input unit, 3 voice recognition unit, 4 operational information storage unit, 5 recognition vocabulary comprehension level decision table, 6 recognition vocabulary comprehension level deciding unit, 7 operational transition information storage unit, 8 operational transition determining unit, 9 operational transition control unit, 10 voice output unit, 11 screen output unit, 12 keyword extracting unit, 13 vehicle running state acquiring unit, 14 recognition vocabulary comprehension level retaining unit, 15 operation frequency storage unit, 16 operational transition alteration guidance storage unit, 17 operational transition alteration cancellation frequency storage unit, 18 alternative means guidance storage unit, 19 operational transition alteration function ON/OFF setting unit, 20 user identifying unit, 21 user-by-user operational information storage unit, 22 user registration unit, 23 user designating unit, 100 operational transition providing unit.

What is claimed is:

1. A navigation apparatus including a voice receiver to receive an instruction by voice input, and a voice recognizer to carry out voice recognition of the instruction received by the voice receiver, the navigation apparatus comprising:
   a recognition vocabulary comprehension level decider to decide a user comprehension level of a recognition vocabulary for instructions recognizable by the voice recognizer, from at least one of correction operation frequency and time-out frequency in an operation of recognizing the instruction which is carried out during the voice recognition by the voice recognizer and corresponds to the instruction;
   an operational transition determiner to determine an operational transition from a plurality of potential operational transitions in accordance with a decision result of the recognition vocabulary comprehension level decider, each of the potential operational transitions including a different number of input steps by which the instruction is voice-recognized, such that different input steps correspond to different subsets of the recognition vocabulary for each potential operation transition that includes multiple input steps; and
   an operational transition provider to provide the operational transition determined by the operational transition determiner, wherein
   the operational transition determiner, when determining the operational transition in accordance with the decision result output from the recognition vocabulary comprehension level decider, switches the operational transition thereby limiting an input content per step by increasing the number of input steps in a specific operational transition, or reducing the number of input steps by increasing an amount of information capable of being input per step in the specific operational transition.

2. The navigation apparatus according to claim 1, wherein the operational transition determiner, when determining the operational transition in accordance with the decision result output from the recognition vocabulary comprehension level decoder, determines to switch the operational transition to an alternative one of the potential operational transitions capable of achieving the same purpose.

3. The navigation apparatus according to claim 1, wherein the operational transition determiner, when determining the operational transition in accordance with the decision result output from the recognition vocabulary comprehension level decider, prepares the potential operational transitions with a plurality of patterns in advance, and alters the operational transition stepwise in accordance with ease of understanding and a number of input steps.

4. The navigation apparatus according to claim 1, further comprising:
   a keyword extractor to extract a specific keyword from the content recognized by the voice recognizer, wherein
   the operational transition determiner determines the operational transition in accordance with the keyword in past utterance in the transition and the recognition vocabulary comprehension level.

5. The navigation apparatus according to claim 1, wherein the recognition vocabulary comprehension level decider adjusts its standards for the decision in accordance with a past operation content history.

6. The navigation apparatus according to claim 1, wherein the recognition vocabulary comprehension level decider adjusts its standards for the decision in accordance with a vehicle running state.

7. The navigation apparatus according to claim 1, wherein the recognition vocabulary comprehension level decider prevents, for a prescribed period of time after an operational transition alteration, the recognition vocabulary comprehension level from being altered, or the operational transition from being switched even if the recognition vocabulary comprehension level is altered.

8. The navigation apparatus according to claim 1, wherein the navigation apparatus makes, on a function-by-function basis, a decision of the recognition vocabulary comprehension level by the recognition vocabulary comprehension level decider and the determination of the operational transition based on the decision.

9. The navigation apparatus according to claim 1, wherein the navigation apparatus, when switching the operational transition in accordance with a decision result by the recognition vocabulary comprehension level decider, provides a user with a manner of the alteration before the alteration through voice output or screen output.

10. The navigation apparatus according to claim 1, wherein
   the navigation apparatus enables a user to cancel a switching of the operational transition at a time when the operational transition determiner determines to switch the operational transition.

11. The navigation apparatus according to claim 10, wherein
   the navigation apparatus, when a user operation cancels a switching to a particular operational transition not less than a prescribed number of times or returns to a previous operational transition not less than a prescribed number of times after a switching to the particular operational transition, excludes the particular operational transition from a target of the operational transition determination for a prescribed period of time or to eternity.

12. The navigation apparatus according to claim 1, wherein
the navigation apparatus enables a user to return to the previous operational transition at an arbitrary timing after the determination by the operational transition determiner causes the operational transition to switch.

13. The navigation apparatus according to claim 1, wherein
the navigation apparatus, if the recognition vocabulary comprehension level is not raised even after a prescribed period of time has elapsed after the operational transition determiner determines to switch to an easiest-to-understand operational transition, provides a user with an alternative means of the operational transition.

14. The navigation apparatus according to claim 1, wherein
the navigation apparatus enables a user to select enabling/disabling the determination of the operational transition by the operational transition determiner.

15. The navigation apparatus according to claim 1, further comprising:
a user identifier to identify a user, wherein
the recognition vocabulary comprehension level decider and the operational transition determiner make a decision of the recognition vocabulary comprehension level and a determination of the operational transition on a user-by-user basis identified by the user identifier.

16. The navigation apparatus according to claim 1, further comprising:
a user designator to designate any desired user from a user list that has already been registered, wherein
the recognition vocabulary comprehension level decider and the operational transition determiner make a decision of the recognition vocabulary comprehension level and a determination of the operational transition on a user-by-user basis designated by the user designator.

* * * * *